(12) United States Patent
Ibuki

(10) Patent No.: US 10,614,654 B2
(45) Date of Patent: Apr. 7, 2020

(54) DRIVING-DEVICE CONTROL APPARATUS FOR DRIVING MOVING BODY BACK AND FORTH AND GAME MACHINE INCLUDING DRIVING-DEVICE CONTROL APPARATUS

(71) Applicant: OMRON Corporation, Kyoto-shi, Kyoto (JP)

(72) Inventor: Hiroyuki Ibuki, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/901,423

(22) Filed: Feb. 21, 2018

(65) Prior Publication Data

US 2018/0197367 A1 Jul. 12, 2018

Related U.S. Application Data

(63) Continuation of application No. PCT/JP2016/088797, filed on Dec. 26, 2016.

(30) Foreign Application Priority Data

Feb. 15, 2016 (JP) .................................. 2016-026098
Feb. 15, 2016 (JP) .................................. 2016-026120

(51) Int. Cl.
*G07F 17/32* (2006.01)
*H02P 7/29* (2016.01)
(Continued)

(52) U.S. Cl.
CPC ............ *G07F 17/3213* (2013.01); *A63F 5/04* (2013.01); *A63F 7/02* (2013.01); *G07F 17/3216* (2013.01);
(Continued)

(58) Field of Classification Search
CPC .. G07F 17/3213; G07F 17/34; G07F 17/3216; G07F 17/3211
See application file for complete search history.

(56) References Cited

U.S. PATENT DOCUMENTS 5,839,957 A * 11/1998 Schneider ........... G07F 17/3213
463/20
2003/0062682 A1* 4/2003 Kato ................... G07F 17/3213
273/292
(Continued)

FOREIGN PATENT DOCUMENTS

GB 1471866 A * 4/1977 ......... G07F 17/3269
GB 1471866 A 4/1977
(Continued)

OTHER PUBLICATIONS

The extended European search report (EESR) dated Sep. 10, 2018 in a counterpart European patent application.
(Continued)

*Primary Examiner* — Chase E Leichliter
(74) *Attorney, Agent, or Firm* — Metrolex IP Law Group, PLLC

(57) ABSTRACT

In order to control driving a moving body back and forth a driving-device control apparatus including a communication unit and a control unit receives a control command from a host controller and controls a driving device to drive a moving body back and forth based on the control command. The communication unit receives the control command including a round-trip instruction for causing the moving body to operate back and forth from the host controller. The control unit controls the driving device to operate the moving body back and forth based on instructions in the control command when the control command includes the round-trip instruction.

15 Claims, 17 Drawing Sheets

(51) Int. Cl.
 *A63F 5/04* (2006.01)
 *A63F 7/02* (2006.01)
 *G07F 17/34* (2006.01)

(52) U.S. Cl.
 CPC ............... *G07F 17/34* (2013.01); *H02P 7/29* (2013.01); *G07F 17/3211* (2013.01)

(56) References Cited

U.S. PATENT DOCUMENTS

| | | | | |
|---|---|---|---|---|
| 2004/0014516 | A1* | 1/2004 | Inoue | G07F 17/3213 463/20 |
| 2005/0059454 | A1* | 3/2005 | McComb | G07F 17/3213 463/16 |
| 2008/0305848 | A1* | 12/2008 | Okada | G07F 17/3213 463/20 |
| 2012/0115568 | A1* | 5/2012 | Fujisawa | G07F 17/3213 463/20 |
| 2012/0115569 | A1* | 5/2012 | Fujisawa | G07F 17/3213 463/20 |
| 2014/0232063 | A1* | 8/2014 | Takahashi | A63F 11/00 273/148 R |
| 2014/0364213 | A1* | 12/2014 | Matsushita | G07F 17/3213 463/31 |
| 2015/0332544 | A1* | 11/2015 | Kitamura | G07F 17/34 463/20 |
| 2015/0332545 | A1* | 11/2015 | Kitamura | G07F 17/3213 463/20 |
| 2016/0055704 | A1* | 2/2016 | Kitamura | G07F 17/3213 463/20 |
| 2016/0093146 | A1* | 3/2016 | Kitamura | G07F 17/3258 463/21 |

FOREIGN PATENT DOCUMENTS

| | | |
|---|---|---|
| JP | H09-269633 A | 10/1997 |
| JP | 2000-166275 A | 6/2000 |
| JP | 2002-78388 A | 3/2002 |
| JP | 2011-147201 A | 7/2011 |
| JP | 2013-51794 A | 3/2013 |
| JP | 2014-73024 A | 4/2014 |
| JP | 2014-236815 A | 12/2014 |
| JP | 2015-131034 A | 7/2015 |

OTHER PUBLICATIONS

An English translation of the International Search Report of PCT/JP2016/088797 dated Mar. 21, 2017.
An English translation of the Written Opinion of PCT/JP2016/088797 dated Mar. 21, 2017.
The Japanese Office Action dated Jul. 2, 2019 in a counterpart Japanese patent application.
Japanese Office Action ("JPOA") dated Jan. 21, 2020 in a counterpart Japanese patent application.

* cited by examiner

| Operation | TR1 | TR2 | TR3 | TR4 |
|---|---|---|---|---|
| Forward, Drive | ON | OFF | OFF | ON |
| Forward, Stop | OFF | OFF | OFF | OFF |
| Reverse, Drive | OFF | ON | ON | OFF |
| Reverse, Stop | OFF | OFF | OFF | OFF |
| Park [Brake] | OFF | OFF | ON | ON |

DRIVING-DEVICE CONTROL APPARATUS FOR DRIVING MOVING BODY BACK AND FORTH AND GAME MACHINE INCLUDING DRIVING-DEVICE CONTROL APPARATUS

CROSS REFERENCE TO RELATED APPLICATIONS

This application is a continuation application of International Application No. PCT/JP2016/088797, filed on Dec. 26, 2016, which claims priority based on the Article 8 of Patent Cooperation Treaty from prior Japanese Patent Application No. 2016-026120, filed on Feb. 15, 2016, and from prior Japanese Patent Application No. 2016-026098, filed on Feb. 15, 2016, the entire contents of all of which are incorporated herein by reference.

FIELD

The disclosure relates control apparatus that controls a driving device used drives a moving body, and a game machine provided with said driving device control apparatus.

BACKGROUND

Various schemes and devices are employed in game machines, e.g., slot and pinball machines to provide presentation effects that appeal to a player's visual and auditory senses, or sense of touch to increase the player's interest in the game. A moving body such as a moving gadget may be provided in a game machine to provide a presentation effect that appeals particularly to a player's visual senses. A driving device such as a so-called stepping motor may drive this kind of moving body. A host control device and a stepping motor control circuit commands for rotating the setting during a predetermined direction coincides the moving body travels towards a specified location in accordance with the state of play. The host control device may be a processor unit used to provide presentation effects; hereafter such a device is referred to as the presentation CPU. The control circuit outputs a control signal to a drive circuit that drives the stepping motor; the control signal is responsive to the command received by the control circuit (for example, refer to Japanese Patent Publication No. 2013-51794).

The driving-device control apparatus described in JP 2013-51794A determines the displacement for the moving body on the basis of the difference between the destination for the moving body in the current position of the moving body received from the host control device (referred to as the presentation CPU) and drives the moving body on till the same arrives at the destination. Even if the host control device has no information on the present position of the moving body, the driving-device control apparatus described in JP 2013-51794A is capable of moving the moving body to a desired destination and reducing the processing load on the host control device.

In addition, a recent trend is to increase the number of moving bodies mounted in a game machine to increase a player's interest in the game. The number of motors needed to drive the moving bodies increases when the number of moving bodies mounted in the game machine increases. However, the space available behind the game machine is limited; therefore, the potential disadvantage is that complexity of arranging motors increases and the number of motors increases. Stepping motors in particular require multiphase magnetic control, and this complicated structure carries a correspondingly larger footprint. Moreover, a stepping motor is relatively expensive. Therefore, increasing the number of stepping motors is not ideal.

More large moving gadgets are mounted in the game machine to increase the player's interest. Driving this kind of moving gadget requires a high torque motor. However, the stepping motor must be a larger size to provide a higher torque; as a result, it tends to be more difficult to secure space to arrange the stepping motor.

In contrast, a direct-current (DC) motor is one kind of generally available device. The dc motor is cheaper than a stepping motor and even with the smaller footprint than a stepping motor is able to output the same amount of torque. Thus, one technique proposes making the moving body travel to a destination position using a dc motor and a rotation angle sensor, which outputs a detection signal every time the dc motor rotates a predetermined rotation angle (for example, refer to Japanese Patent Publication No. 2014-73024).

SUMMARY

To increase player interest, the game machine may drive a moving body such as a moving gadget back and forth multiple times with a motor thereby allowing the player to experience a vibration state. For instance, if the moving body were to move back and forth by receiving control command that included information indicating the destination position for the moving body as described in JP 2013-51794A, every round-trip operation would require that a signal is sent for the outbound destination position and inbound destination position. This requires the driving-device control apparatus described in JP 2013-51794A to have at least twice the number of control commands for the number of round trips to operate the moving body back and forth multiple times. This unfortunately increases the processing load on the host control device, which creates and sends the control commands.

One or more embodiments provide a driving-device control apparatus capable of operating a moving body back and forth with fewer control commands.

A driving-device control apparatus includes a communication unit and a control unit and is configured to receive a control command from a host controller and to control a driving device configured to drive a moving body. The communication unit is configured to receive a control command including a round-trip instruction that causes the moving body to operate back and forth. The control unit is configured to control the driving device so that the driving device operates the moving body back and forth in a predetermined manner when the control command includes the round-trip instruction.

The driving-device control apparatus further includes: a storage unit configured to store a present position for the moving body; and the control unit controls the driving device so that the driving device operates the moving body back and forth between the present position and a destination position.

A control command in the driving-device control apparatus may further include the destination position.

The control command in the driving-device control apparatus may further include a target rotation speed for the driving device; and the control unit may control the driving device so that driving device rotates at the target rotation speed when operating the moving body the back and forth.

The control command in the driving-device control apparatus may further include a repeat instruction that directs operation back and forth multiple times; and the control unit may control the driving device so that the moving body operates back and forth for a predetermined number of repetitions when the control command includes the repeat instruction.

One or more embodiments provide a game machine including: a main game unit; and a moving body arranged on the front surface of the main game unit and configured to move in a predetermined configured range; a driving device configured to drive the moving body; a host control unit configured to control a presentation in accordance with a state of play; and a driving-device control apparatus configured to receive a control command from the host control unit and to control the driving device. The driving-device control apparatus includes a communication unit and a control unit and is configured to receive a control command from a host controller and to control a driving device configured to drive a moving body. The communication unit is configured to receive a control command including a round-trip instruction that causes the moving body to operate back and forth. The control unit is configured to control the driving device so that the driving device operates the moving body back and forth in a predetermined manner when the control command includes the round-trip instruction.

The game machine may further include: a storage unit configured to store a present position for the moving body; and the control unit may control the driving device so that the driving device operates the moving body back and forth between the present position and a destination position.

A control command in the game machine may further include the destination position.

The control command in the game machine may further include a target rotation speed for the driving device; and the control unit may control the driving device so that driving device rotates at the target rotation speed when operating the moving body the back and forth.

The control command in the game machine may further include a repeat instruction that directs operation back and forth multiple times; and the control unit may control the driving device so that the moving body operates back and forth for a predetermined number of repetitions when the control command includes the repeat instruction.

The driving-device control apparatus according to one or more embodiments can operate a moving body back and forth with fewer control commands.

DETAILED DESCRIPTION

A motor control device according to one or more embodiments, that is a driving-device control apparatus is described below with reference to the drawings. As above described, the motor control device drives the motor so that the moving body operates back and forth between the present position and a destination position on receiving a control command including a round-trip instruction for making the moving body travel between the present position of the moving body a destination position. On receiving a control command that includes a round-trip instruction, the motor control device can operate the moving body to back and forth with fewer control commands by causing the motor to operate the moving body back and forth.

Figure 1:
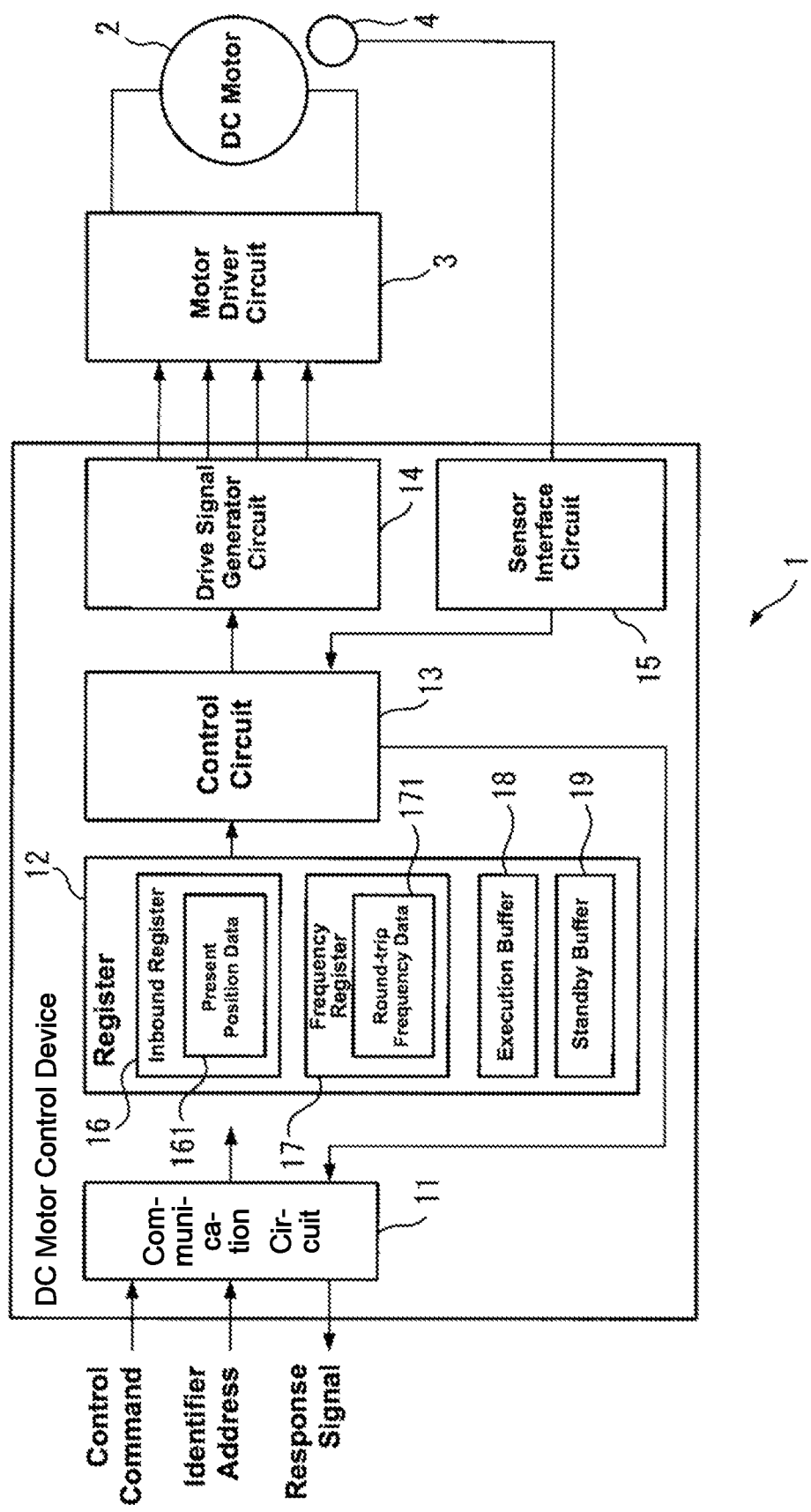
FIG. 1 is a schematic configuration diagram illustrating a motor control device according to one or more embodiments.

FIG. 1 is a schematic configuration diagram of a motor control device according to one or more embodiments. As illustrated in FIG. 1, the DC motor control device 1 includes a communication circuit 11, a register 12, a control circuit 13, a drive signal generator circuit 14, and a sensor interface circuit 15. Each of the components in the DC motor control device 1 may be packaged on a circuit board (not shown) as individual components, or package on a circuit board in an integrated circuit.

The DC motor control device 1 controls a DC motor 2 in accordance with a control command receives from a host control device (also called a host controller). More specifically, the DC motor control device 1 causes a DC motor 2 to rotate at a target rotation speed directed by the control command; this allows the moving body to travel to a position corresponding to the destination position specified in the control command. In one or more embodiments, the DC motor control device 1 uses pulse width modulation (PWM) to generate a drive signal that switches the current supplied to the DC motor 2 on and off. The motor control device 1 outputs the drive signal generated to a motor driver circuit 3 which supplies the DC motor 2 with current and thereby controls the rotation speed of the DC motor 2. A rotary encoder 4 transmits a detection signal every time the rotation shaft (not shown) of the DC motor 2 arrives at a predetermined rotation angle; the DC motor control device 1 receives this detection signal and computes the total rotation since initial rotation of the DC motor 2. The DC motor control device 1 reduces the speed of the DC motor 2 as appropriate in accordance with the difference between a total rotation and a target rotation calculated from a present position and a destination position specified in the control command; hereby, the DC motor control device 1 can stop the DC motor 2 once a DC motor 2 has traveled through exactly the target rotation.

Figures 2, 3:
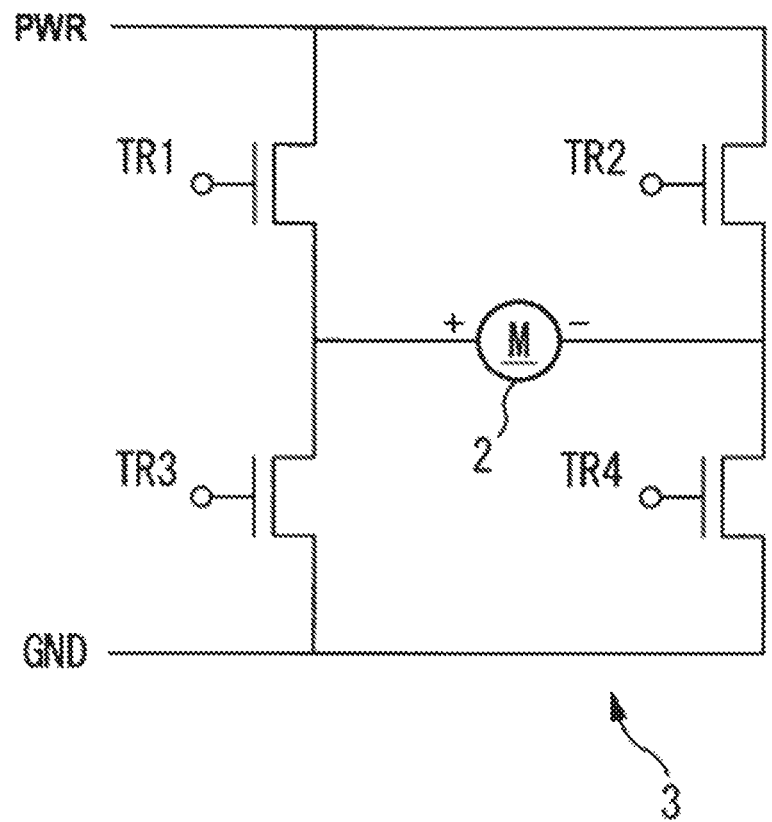
FIG. 2 is a circuit diagram illustrating a motor driver circuit for driving a dc motor.
FIG. 3 is a diagram illustrating an example of a table expressing the relationship between a drive signal applied to switches in a motor driver circuit and the rotation direction of a DC motor.

FIG. 2 is a circuit diagram of the motor driver circuit 3. The motor driver circuit 3 includes four switches TR1-TR4. Each switch may be a bipolar transistor or a field effect transistor. Two of the four switches, specifically switch TR1 and TR3 are connected in series between the power and the ground. The switches TR2 and TR4 are also connected in series between the power and the ground. The positive terminal of the DC motor 2 is connected between the switches TR1 and TR3, whereas the negative terminal of the DC motor 2 is connected between the switches TR2 and TR4. The switch terminals of the switches TR1-TR4 are each connected to the drive signal generator circuit 14; note that if for instance the switches TR1-TR4 are transistors, then the switch terminals are base terminals, and if the switches TR1-TR4 are field effect transistors the switch terminals are gate terminals. The drive signal from the drive signal generator circuit 14 is input to the switch terminals of the switches TR1-TR4.

FIG. 3 illustrates an example of a table expressing the relationship between a drive signal applied to the switches in the motor driver circuit and the rotation direction of a DC motor. As illustrated in the table 300, applying a drive signal to the switch terminals of the switches TR1 and TR4 may drive the DC motor 2 forward. The drive signal may include a periodic pulse; here the pulse is established via pulse width modulation and the width of the pulse defines the rotation speed of the DC motor 2. In contrast, no drive signal is applied to the switch terminals for the switches TR2 and TR3. Hereby, an input voltage is supplied to the positive terminal only when the pulse is applied to switch TR1 and switch TR4 in the DC motor 2; therefore the DC motor 2 rotates forward at a speed defined by the pulse width. Note that, the drive signal may be applied to either one of the switches TR1 or TR4, with the other switch always on to drive the DC motor 2 forward.

In contrast, the DC motor 2 may be driven in reverse by applying a drive signal with a periodic pulse to the switch terminals of the switches TR2 and TR3; here the pulse is established via pulse width modulation, and the pulse defines the rotation speed of the DC motor 2. On the other hand, no drive signal is applied to the switch terminals of the switches TR1 and TR4. Hereby, an input voltage is supplied to the negative terminal only when the pulse is applied to switch TR2 and switch TR3 in the DC motor 2; therefore the DC motor 2 rotates in reverse at a speed defined by the pulse width. Note that, the drive signal may be applied to either one of the switches TR2 or TR3, with the other switch always on to drive the DC motor 2 in reverse.

Additionally, the DC motor 2 may be parked by activating the switch terminals of the switches TR3 and TR4, and deactivating the switch terminals of the switches TR1 and TR2.

The switch terminals for the switches are deactivated when the DC motor 2 is not being driven.

The rotary encoder 4 is one example of a rotation angle sensor, and may be, for instance, an optical rotary encoder. The rotary encoder 4 includes a disk attached to the rotation shaft of the DC motor 2, and a light source and a light receiving element each facing one side of the disk. The disk includes a plurality of slits along the circumference of the disk about the rotation shaft. Each time one of the slits lands between the light source and the light receiving element, the light from the light source reaches the light receiving element, and the rotary encoder 4 consequently outputs a pulsating detection signal. The rotary encoder 4 thus outputs a detection signal each time the DC motor 2 rotates through a predetermined angle of rotation. For instance, providing fifty slits along the circumference of the disk about the rotation shaft of the DC motor 2 allows the rotary encoder 4 to output fifty detection signals when the DC motor 2 performs a single rotation. A Hall IC may be employed as the rotation angle sensor, noting that a Hall IC can detect the changes in a magnetic field generated by a magnet on a rotor.

The components in the DC motor control device 1 are described below.

The communication circuit 11 connects the DC motor control device 1 and the host controller. The host controller may be a presentation CPU in the game machine where the DC motor control device 1 is installed. The communication interface 11 receives a multi-bit control command transmitted serially from the host controller. The communication circuit 11 also receives a clock signal from the host controller; the clock signal is for synchronizing each of the plurality of bits included in a control command to allow parsing of the control command.

Control commands include: an operation command; a setup command; and a setup read command that reads a setting written to the register 12. The operation command includes operation information for specifying the operation of the DC motor 2; more specifically these may be a target rotation speed for the DC motor 2 corresponding to the travel speed for the moving body driven by the DC motor 2; information indicating whether the operation is a one-way operation, a repeating operations, or whether the operation is a round-trip operation; and a destination position representing a coordinate of the destination for the moving body. The setup command includes the number of round trips when the moving body repeatedly performs a round-trip operation multiple times. The clock signal may be a square pulse that is a predetermined number of bits within the control command.

Figure 4A:
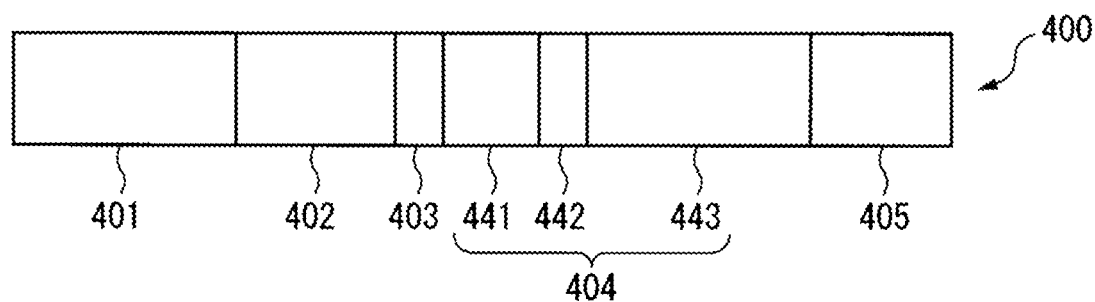
FIG. 4A is a diagram illustrating an example format for an operation command.

FIG. 4A illustrates an example format for an operation command; as illustrated in FIG. 4A, an operation command 400 includes a start flag 401, a device address 402, a command mode flag 403, control data 404, and an end flag 405 in the order from the header. The operation command 400 may also include a spacer, e.g., a single-bit spacer with a value '0', between adjacent flags, and the address and data.

The start flag 401 is a bit string indicating the start of the operation command 400; in one or more embodiments the start flag 401 is a bit string of nine individual bits with the value of "1". Note that the start flag 401 may be any type of bit string that does not match the other bit strings in the operation command 400.

The device address 402 is an identifier address that specifies the driving-device control apparatus for which operation command 400 is destined; in one or more embodiments the device address 402 is expressed as a seven bit string. The operation command 400 includes a device ID indicating the type of device, and a device address that is a serial number used between devices of the same type. In one or more embodiments the device ID is a four-bit string in the device address is a three-bit string. The communication circuit 11 determines whether or not the device address 402 matches and identify address sent separately from the host controller; when there is a match, the communication circuit 11 determines that the DC motor control device 1 is to receive the operation command 400.

The command mode flag 403 is a two-bit flag indicating whether the control command is in operation command, a setup command, or a setting read command. In one or more embodiments a command mode flag 403 of '00' indicates that the control command is an operation command, while a command mode flag 403 of '01' indicates that the control command is a setup command. A command mode flag 403 of '10' indicates that the control command is a setting read command. The control command illustrated in FIG. 4A is an operation command; therefore the command mode flag 403 is '00'.

The control data 404 includes operation information for the DC motor 2 that the DC motor control device 1 controls. More specifically, the control data 404 includes speed data 441, a round-trip control mode flag 442, and destination position data 443.

The speed data 441 represents the target rotation speed of the DC motor 2. In one or more embodiments, the speed data 441 is a four-bit string which may represent any value from 0 to 15. When the speed data 441 is 0, the DC motor 2 is parked; that is, this outputs a park signal that activates switches TR3 and TR4 in the motor driver circuit 3. A speed data 441 of value 1 to 15 indicates that the DC motor 2 is rotating at a target rotation speed corresponding to the value of the speed data 441. In this example, the larger the value of the speed data 441 is the faster the target rotation speed.

The round-trip control mode flag 442 is a two-bit control instruction flag indicating whether the instruction is for one-way operation from the present position of the moving body to a destination position, a single round-trip operation from the present position to a destination position, or a repeating round-trip operation over a number of times; i.e., a repeating operation. In one or more embodiments a round-trip control mode flag 442 of '00' indicates that the instruction is for one-way operation from the present position of the moving body to a destination position. A round-trip control mode flag 442 of '01' indicates that the instruction is for a single round-trip operation from the present position to a destination position, while a round-trip control mode flag 442 of '10 indicates a repeating operation. The most significant bit of the round-trip control mode flag 442 is a repeater flag representing an instruction for repeating operation; the least significant bit of the round-trip control mode flag 442 is a round-trip flag indicating an instruction for a round-trip operation from the present position to a destination position.

The destination position data 443 represents the amount of rotation of the DC motor 2 corresponding to the displacement of the moving body from a predetermined origin to the destination position. In one or more embodiments the destination position data 443 is a 13-bit string. As an example, the predetermined origin may be a location where a screen hides the moving body so that the moving body is not visible to the player; however, the origin may be any location from which the moving body may travel. The destination position data 443 expresses the destination position as the number of detection signals received from the rotary encoder 4. The actual destination position of the moving body equals the value indicated by the destination position data 443 multiplied by the central angle between adjacent slits in the rotary encoder 4 and the gear ratio between the DC motor 2 and the moving body.

The end flag 405 is a bit string indicating the end of the operation command 400. The end flag 405 may be any bit string that does not match the start flag and other bit strings included in the control command.

Figure 4B:
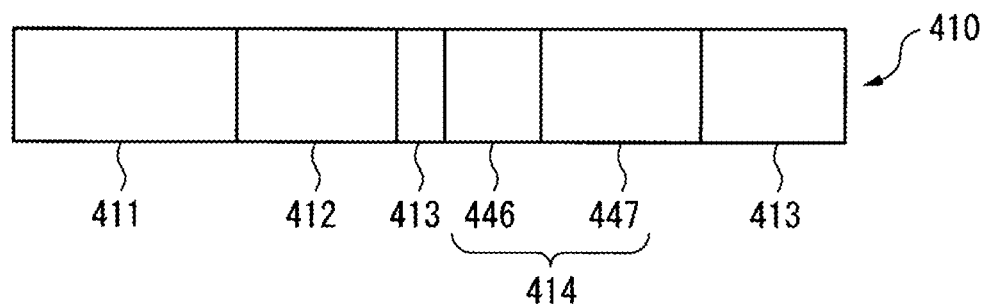
FIG. 4B is a diagram illustrating an example format for a setup command.

FIG. 4B illustrates an example format for a setup command; as illustrated in FIG. 4B, a setup command 410 includes a start flag 411, a device address 412, a command mode flag 413, control data 414, and an end flag 415 in the order from the header. The setup command 410 may also include a spacer, e.g., a single-bit spacer with a value '0', between adjacent flags, and the address and data. The start flag 411, device address 412, and end flag 415 are structured identically to the start flag 401, device address 402, and end flag 405 of the operation command 400. The setup command 410 differs from the operation command 400 in that the command mode flag 413 holds the value '01', and the control data 414 includes a setup address flag 446 and round-trip frequency data 447. Therefore, the setup address flag 446 and the round-trip frequency data 447 are described below.

The setup address flag 446 is a four-bit string that establishes the address used for the round-trip frequency data. Data can be stored in a data configuration region; the data configuration region is provided with sixteen configuration areas wherein various data may be stored individually therein. In one or more embodiments, the round-trip frequency data is created at the address '0110'.

The round-trip frequency data 447 indicates the round-trip frequency N of the moving body when the moving body repeats the round-trip operation multiple times. In one or more embodiments, the speed data 441 is a seven-bit string which may represent any value from 1 to 255. The round-trip frequency N may specify any value from 1 to 255.

Figure 4C:
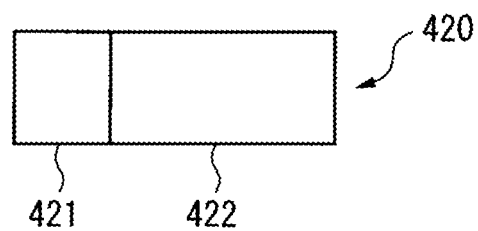
FIG. 4C is a diagram illustrating an example format for a response signal.

FIG. 4C illustrates an example format for a response signal; as illustrated in FIG. 4C, the response signal 420 includes a buffer flag 421 and the present position data 422 in order from the header. The response signal 420 may also include a blank, e.g., an 18-bit blank with a value '1', between adjacent flags, and the address and data.

The buffer flag 421 is a two-bit flag indicating whether or not data has been written to both the execution buffer 18 and the standby buffer 19 in the register 12. Both the execution buffer 18 and the standby buffer 19 contain written data when the buffer flag 421 is '00'. The execution buffer 18 contains written data and the standby buffer 19 contains no written data when the buffer flag 421 is '01'. Both the execution buffer 18 and the standby buffer 19 contain no written data when the buffer flag 421 is '11'.

Present position data 422 indicates the amount of rotation of the DC motor 2 corresponding to the displacement of the moving body from a predetermined point of origin to the present position. In one or more embodiments the present position data 422 is a 13-bit string. The present position data 422 indicates the present position as the number of detection signals received from the rotary encoder 4 similarly to the destination position data 443.

The communication circuit 11 receives an identifier address from the host controller for specifying the DC motor control device for which a control command is destined. When the identifier address and the device address included in the control command match, the communication circuit 11 writes the operation information or the setup information included in the control command to the register 12. In contrast, the communication circuit 11 destroys the control command received when the identifier address and the device address do not match.

Note that the identifier address may be stored in a memory circuit, so that the determination of whether or not an identifier address and a device address match can be made even if the identifier address and the control command are received at different times.

The register 12 possesses a so-called first in first out (FIFO) memory circuit, and includes the execution buffer 18 and the standby buffer 19. The memory circuit included in the register 12 is made up of volatile semiconductor memory circuits that are readable and writable. The execution buffer 18 and the standby buffer 19 each alternately store the speed data 441, the round-trip control mode flag 442, and the destination position data 443 included in the control data 404 of an operation commands 400 received at the communication circuit 11. Once the speed data 441, the round-trip control mode flag 442, and the destination position data 443 are read into the control circuit 13, the execution buffer 18 and the standby buffer 19 each delete the speed data 441, the round-trip control mode flag 442, and the destination position data 443 that was read.

The register 12 further includes an inbound register 16 and a frequency register 17. The inbound register 16 stores present position data 161 indicating the present position of the moving body when the communication circuit 11 receives an operation command. The frequency register 17 stores round-trip frequency data 171 extracted from the round-trip frequency data 447 specified by a setup command transmitted in advance. The register 12 deletes the present position data 161 and the round-trip frequency data 171 read once the control circuit 13 reads the present position data 161 and the round-trip frequency data 171 stored in the register 12.

The control circuit 13 may include for instance, a processor and a non-volatile memory circuit. The control circuit 13 compares the destination position data 443 acquired by the communication circuit 11 and the present position data 161 read from the register 12 and determines a target rotation and rotation direction for the DC motor 2. The control circuit 13 also determines the duty cycle for a drive signal on the basis of the speed data 441 acquired via the communication circuit 11 and a detection signal from the rotary encoder 4. The control circuit 13 notifies the drive signal generator circuit 14 of the target rotation, rotation direction, and duty cycle determined.

When causing the moving body to perform a round trip, the control circuit 13 controls the DC motor 2 to match a target rotation from the present position to the destination position on the outbound trip; here, the present position corresponds to the present position data 161 stored in the register 12, and the destination position corresponds to the destination position data 443. On the inbound trip, the control circuit 13 reverses the rotation direction of the DC motor 2 and controls the DC motor 2 to match a target rotation from the destination position to the present position; here again, the destination position corresponds to the destination position data 443, and the present position corresponds to the present position data 161 stored in the register 12.

The drive signal generator circuit 14 includes a variable pulse generator circuits, and a switching circuit. The variable pulse generator circuit changes the width of the pulse output, and the switching circuit selects the switch in the motor driver circuit 3 to which a drive signal is output. Here the drive signal is a periodic pulse signal generated by the variable pulse generator circuit. The drive signal generator circuit 14 generates a drive signal for driving the DC motor 2 using pulse width modulation in accordance with the duty cycle sent by the control circuit 13 and outputs the drive signal to one of the switches in the motor driver circuit 3. One cycle of the drive signal may be 50 µs. For instance, when the control circuit 13 provides a notification that the rotation direction is the forward direction, the drive signal generator circuit 14 outputs a periodic pulse signal to the switches TR1 and TR4 in the motor driver circuit 3. Whereas, when the control circuit 13 provides a notification that the rotation direction is the reverse direction, the drive signal generator circuit 14 outputs a periodic pulse signal to the switches TR2 and TR3 in the motor driver circuit 3.

The sensor interface circuit 15 receives detection signals from the rotary encoder 4. The sensor interface circuit 15 outputs a detection signal to the control circuit 13 each time a detection signal is received.

Figure 5:
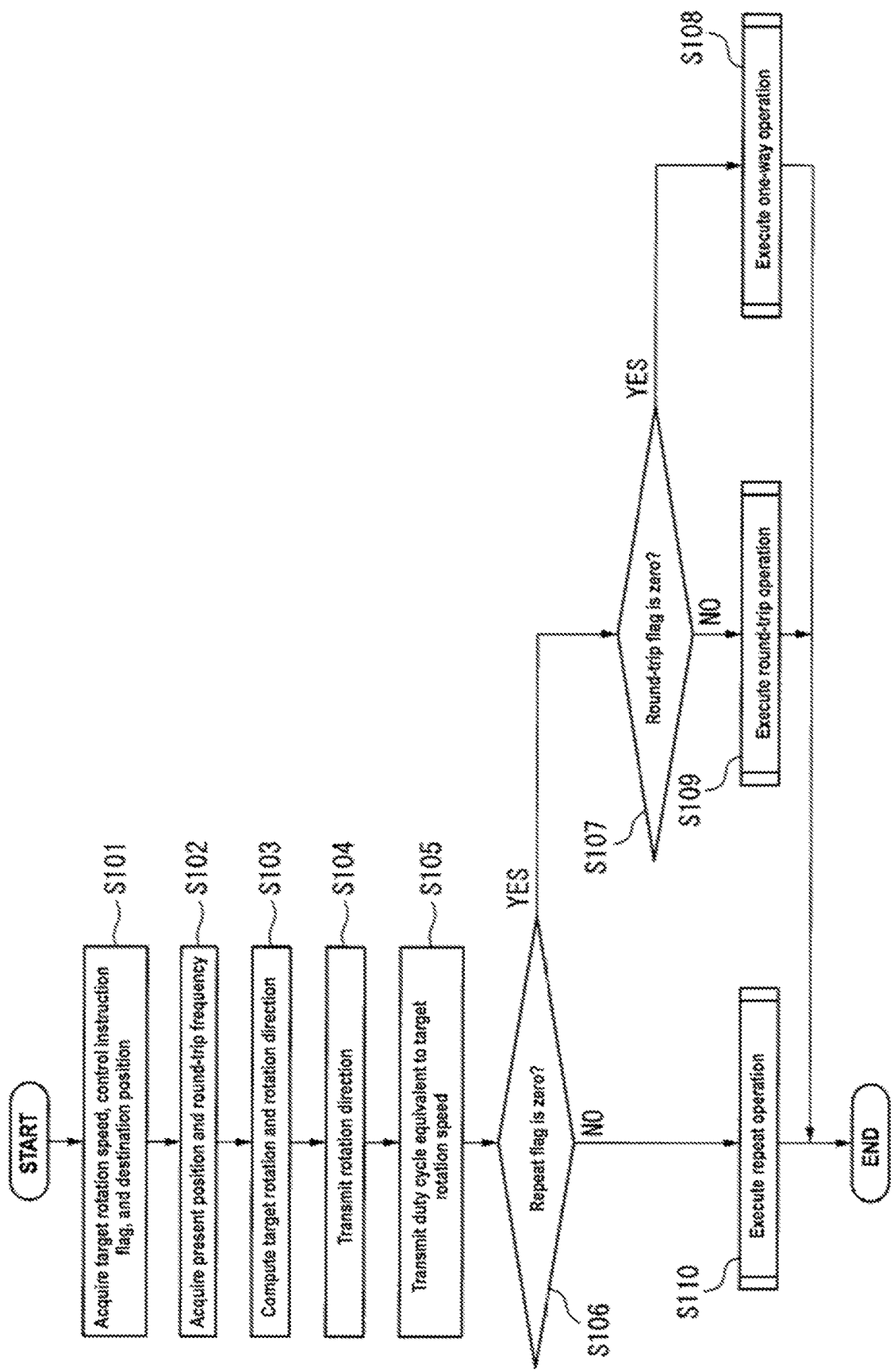
FIG. 5 is a flowchart illustrating a DC motor control process run by a motor control device, such as in FIG. 1.

FIG. 5 is a flowchart depicting a DC motor control process run by the DC motor control device 1.

First, the control circuit 13 acquires target rotation speed, control instruction flag, and destination position from the corresponding speed data 441, the round-trip control mode flag 442, and destination position data 443 in the operation command 400 acquired via the communication circuit 11 (S101). The control circuit 13 then acquires the present position and round-trip frequency data N corresponding to the present position data 161 stored in the inbound register 16 and the round-trip frequency data 171 stored in the frequency register 17 of the register 12 respectively (S102). Next, the control circuit 13 computes a target rotation from the difference between the destination position and the present position of the moving body, and computes a rotation direction of the DC motor 2 from the positional relationship between the destination position and the present position of the moving body (S103). Note that the target rotation represents the rotation of the DC motor 2 from the present position to the destination position. The control circuit 13 then notifies the drive signal generator circuit 14 of the rotation direction computed in S103 (S104).

Subsequently, the control circuit 13 determines the duty cycle from the target rotation speed corresponding to the speed data 441, and notifies the drive signal generator circuit 14 of the determined duty cycle (S105). The control circuit 13 compares the target rotation speed and the duty cycle of the drive signal to determine the duty cycle from a speed table (not shown) that stores the relationship. The drive signal generator circuit 14 creates a drive signal having a pulse width commensurate with the rotation direction and duty cycle transmitted in S104 and S105, and outputs the drive signal to the motor driver circuit 3.

The control circuit 13 assesses whether the repeat flag included in the control instruction flag acquired in S101 is a '0' or a '1'. If the repeat flag is '1' (Yes, S106), the control circuit 13 further assesses whether the round trip flag included in the control instruction flag acquired in S101 is a '0' or a '1'. If the round trip flag is '0' (Yes, S107), the control circuit 13 executes a one-way operation that causes the moving body travel from the present position to a target position (S108). If the round trip flag is '1' (No, S107), the control circuit 13 executes a single round-trip operation that causes the moving body to travel from the present position to a target position and then return from the target position to the present position (S109). The control circuit 13 executes a repeat process which causes a round-trip operation to run multiple times if the repeat flag is '1' in S106 (No, S106).

Figure 6:
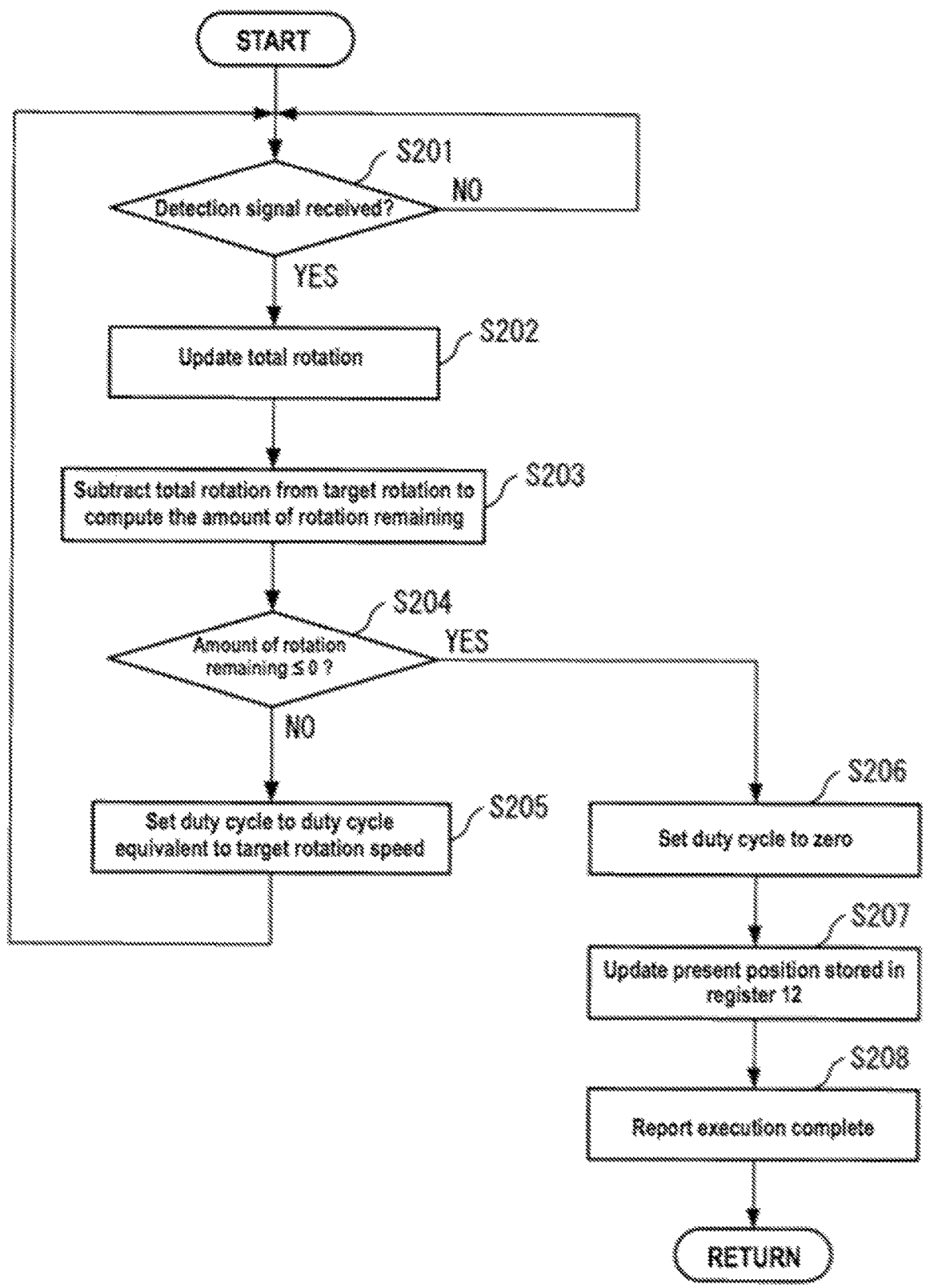
FIG. 6 is a detailed flowchart illustrating a one-way operation, such as in S108 in FIG. 5.

FIG. 6 is a detailed flowchart of the one-way operation run in S108 in FIG. 5.

The control circuit 13 determines whether or not the sensor interface circuit 15 receives a detection signal from the Rotary encoder 4. If no detection signal was received, the control circuit 13 repeats step S201 until a detection signal is received. On receiving a detection signal, i.e. when the DC motor 2 travels through the rotation angle of a single step, the control circuit 13 updates the total rotation for the command set in execution by adding the rotation angle of the single step to the total rotation from where the DC motor 2 started rotation (S202). The control circuit 13 computes the amount of rotation remaining by subtracting the total rotation from the target rotation specified in a command set (S203).

Once the control circuit 13 computes the amount of rotation remaining, the control circuit 13 determines whether or not the amount of rotation remaining equals zero. If the amount of rotation remaining is greater than zero, i.e., if the total rotation of the DC motor 2 is not at a target rotation (No, S204), the control circuit 13 sets the duty cycle of the drive signal to a duty cycle equivalent to the target rotation speed (S205), and notifies the drive signal generator circuit 14 of the new duty cycle. The drive signal generator circuit 14 creates a drive signal having a pulse width commensurate with the duty cycle transmitted thereto, and outputs the drive signal generated to the motor driver circuit 3. The control circuit 13 repeats steps S201 through S205 on till the amount of rotation remaining is zero or less (Yes, S204).

If the amount of rotation remaining is zero or less, i.e., if the total rotation of the DC motor 2 is at a target rotation (Yes, S204), the control circuit 13 sets the duty cycle of the drive signal to zero, and notifies the drive signal generator circuit 14 of the new duty cycle. When the duty cycle transmitted is zero, the drive signal generator 14 outputs a park signal to the motor driver circuit 3. Subsequently, the control circuit 13 overwrites the present position data 161 indicating the present position stored by the register 12 with the destination position data 443 acquired in S101 to thereby update the present position (S207). The control circuit 13 reports the one-way operation is complete by transmitting a response signal 420 to the host controller via the communication circuit 11 (S208). The control circuit thereafter ends the one-way operation.

Figure 7A:
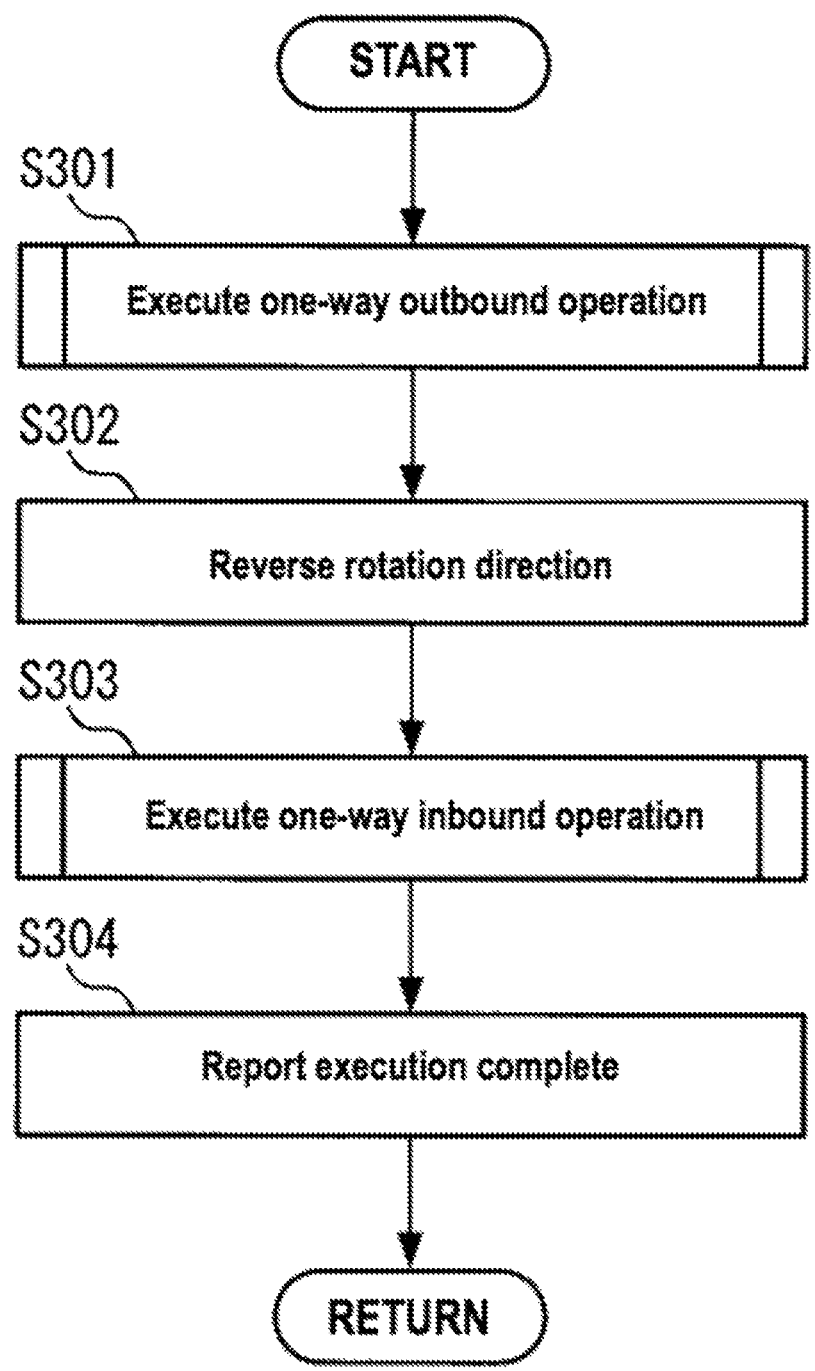
FIG. 7A is a detailed flowchart illustrating a one-way operation, such as in S109 in FIG. 5.
Figure 7B:
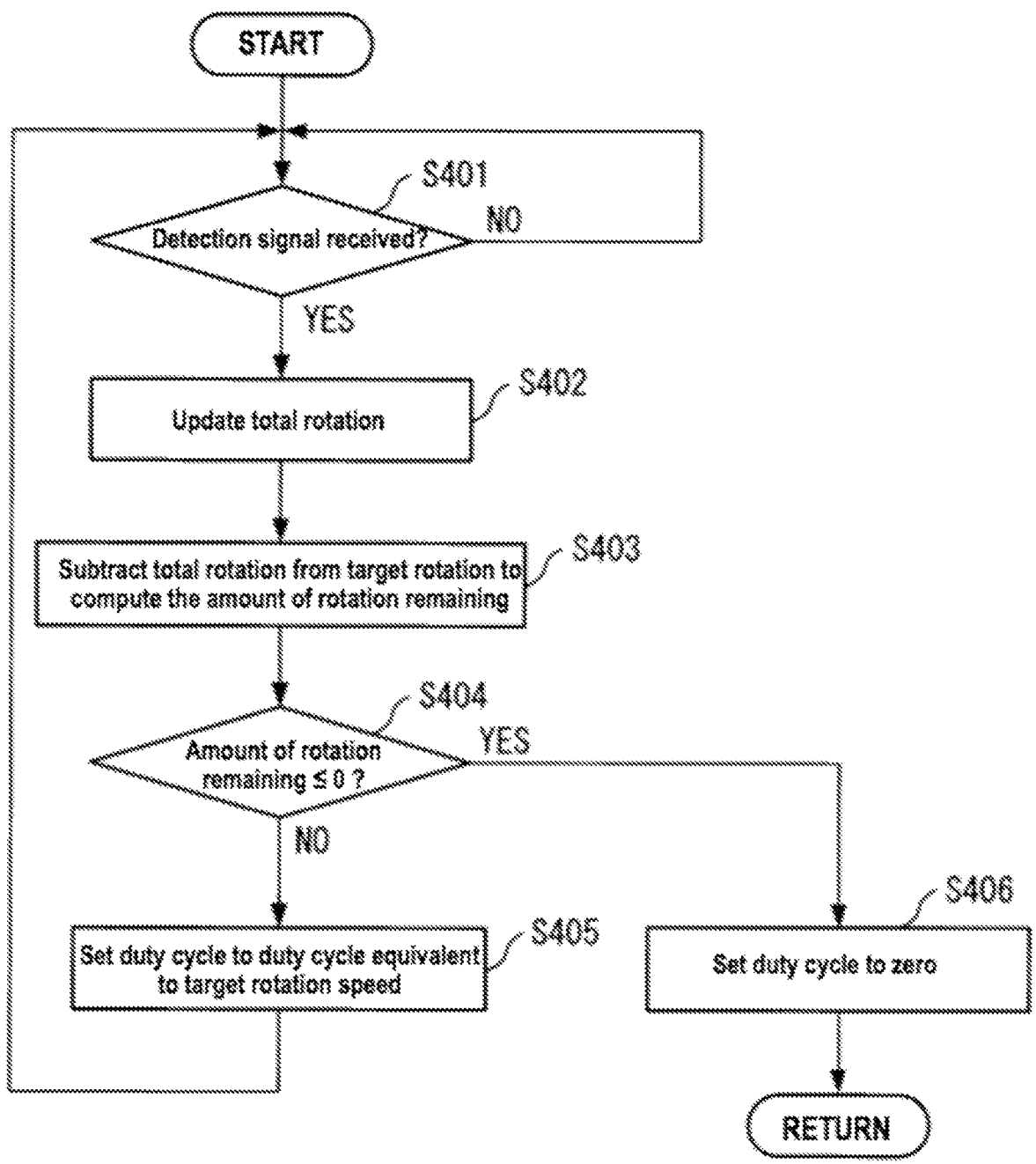
FIG. 7B is a detailed flowchart illustrating processes, such as in S301 and S303 in FIG. 7A.

FIG. 7A is a detailed flowchart of a round trip process run in S109; and FIG. 7B is a detailed flowchart of the processes run in S301 and S303 in FIG. 7A.

The control circuit 13 executes the process illustrated in FIG. 7B to thereby execute an outbound one-way operation (S301). After reversing the rotation direction of the DC motor 2 (S302), the control circuit 13 then executes the inbound one-way operation (S303). The control circuit 13 reports the round trip process is complete by transmitting a response signal 420 to the host controller via the communication circuit 11 (S304). The control circuit thereafter ends the round trip process. The processes illustrated in S401 through S406 in FIG. 7B are identical to S201 through S206 described with reference to FIG. 6; therefore, the details of these processes are omitted.

Figure 8:
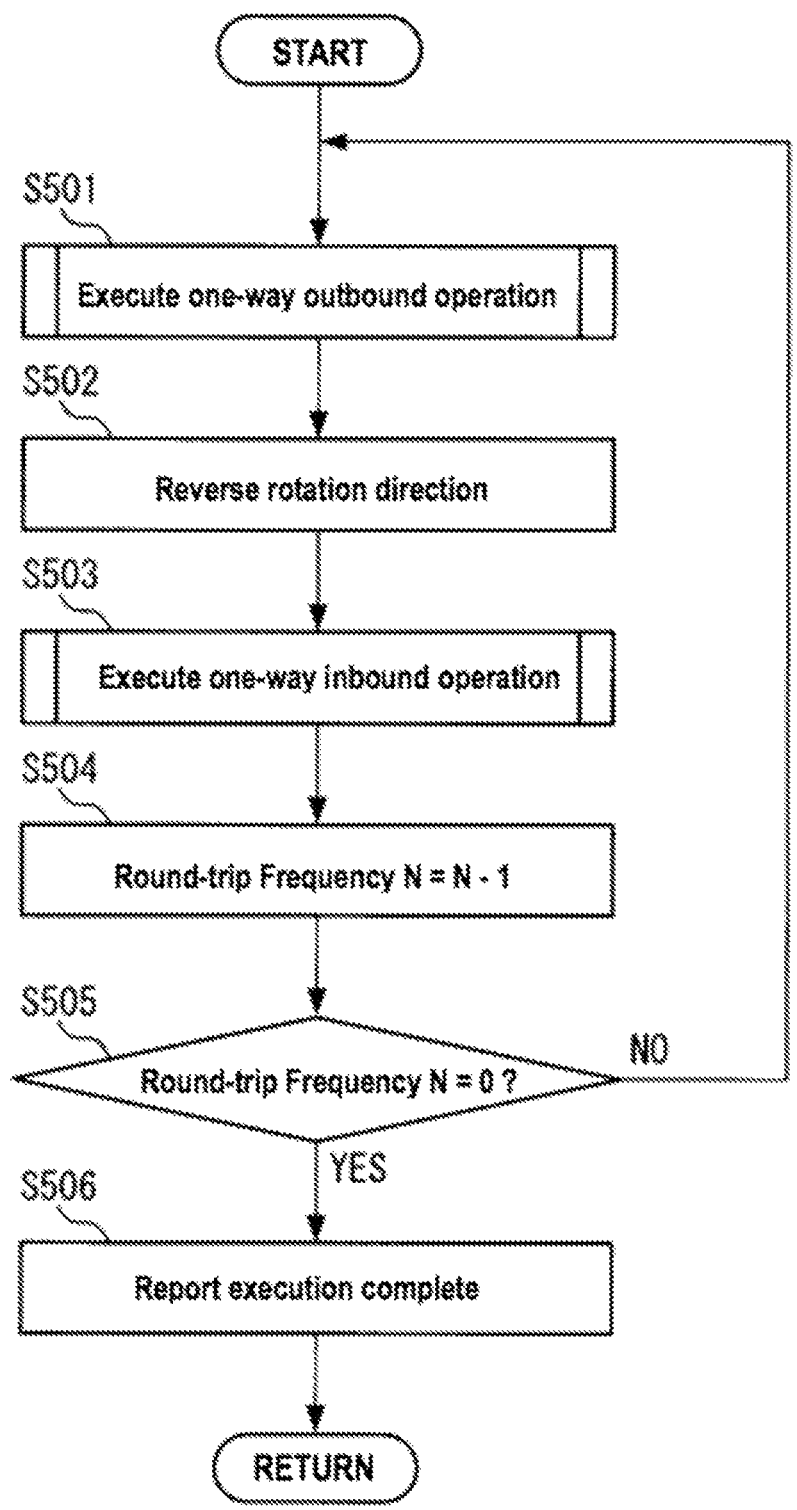
FIG. 8 is a detailed flowchart illustrating a one-way operation, such as in S110 of FIG. 5.

FIG. 8 is a detailed flowchart of the repeat operation in S110 of FIG. 5.

The control circuit 13 executes the process illustrated in FIG. 7B to thereby execute an outbound one-way operation (S501). After reversing the rotation direction of the DC motor 2 (S502), the control circuit 13 then executes the inbound one-way operation (S503). The control circuit 13 then decrements the round-trip frequency N by 1 and overwrites the round-trip frequency data 171 stored in the frequency register 17 with the decremented round-trip frequency N (S504). The control circuit 13 determines whether or not the decremented round-trip frequency N is zero (S505). If the decremented round-trip frequency N is non-zero (No, S505), the control circuit 13 repeats S501 through S505 until the decremented round-trip frequency N is zero. If the decremented round-trip frequency N is zero (Yes, S505), the control circuit 13 continues to S506.

The control circuit 13 reports the repeat operation is complete by transmitting a response signal 420 to the host controller via the communication circuit 11 when the decremented round-trip frequency N is zero (S506). The control circuit thereafter ends the repeat operation. The processes illustrated here are identical to S201 through S206 described with reference to FIG. 6; therefore, the details of these processes are omitted.

The driving-device control apparatus according to one or more embodiments achieves operates the moving body back and forth with fewer control commands by controlling the driving device so that the moving body travels back and forth upon receiving a control command that includes bits indicating that the moving body is to operate back and forth. The driving-device control apparatus according to one or more embodiments can also implement repeating operations for the moving body with fewer commands control commands because the control command further includes a bit representing the instruction to perform a repeat operation.

Since the control command further includes a bit indicating a destination position for the moving body, the driving-device control apparatus according to one or more embodiments allows the moving body to vibrate as desired by operating the moving body back and forth. The moving body may be operated back and forth at a desired speed since the control command further includes a bit indicating a target rotation speed for the moving body. The driving-device control apparatus according to one or more embodiments makes it possible to provide higher quality effects that serve to increase a player's interest in a game since the driving-device control apparatus can cause the moving body to operate back and forth at a desired amplitude and speed.

The DC motor control device 1 is configured to control the DC motor 2; however, a driving-device control apparatus according to one or more embodiments may be configured to control other driving devices such as a stepping motor.

Additionally, while the DC motor control device 1 is configured to control a single DC motor 2, a driving-device control apparatus according to one or more embodiments may be configured to control a plurality of DC motors 2. A driving device control apparatus according to one or more embodiments may be configured to control various driving devices such as a DC motor and a stepping motor, or the like. Note that operating the moving body back and forth not only includes causing the moving body to travel back and forth between a present position and a destination position along a straight line; this moving back and forth may also include causing the moving body to travel back and forth between a present position and a destination position along an arc.

The DC motor control device 1 is configured to operate a moving body back and forth between a present position and a destination position; however a driving device control apparatus according to one or more embodiments may be configured to operate the moving body back and forth in a predetermined section when the control command received at the driving device control apparatus includes a round-trip instruction. The section on which the moving body travels back and forth may be stored in advance in a register of the driving device control apparatus according to one or more embodiments, or may be included in the control command.

The DC motor control device 1 receives speed data 441 representing a target rotation speed and destination position data 443 representing a destination position from the operation command 400 and accompanying round-trip control mode flag 442. However, a driving-device control apparatus according to one or more embodiments may receive speed data 441 representing a target rotation speed and destination position data 443 representing a destination position from another control command that is different from an operation command 400 including a round-trip control mode flag 442. Additionally, while the DC motor control device 1 receives round-trip frequency data 447 representing the round-trip frequency N, by accepting a setup command 410, a driving device control apparatus according to one or more embodiments may be configured to receive round-trip frequency data representing a round-trip frequency from a control command identical to the round-trip control mode flag 442.

The DC motor control device 1 may also compute the target rotation and rotation direction of the DC motor 2 from destination position data 443 representing a destination position and present position data 161 representing the present position of the moving body. However, a driving device control apparatus according to one or more embodiments may receive a control command from a host controller containing a target rotation and rotation direction for the DC motor 2.

A DC motor control device according to any of one or more embodiments or modification examples may be mounted in a game machine such as a pinball machine or a slot machine.

Figure 9:
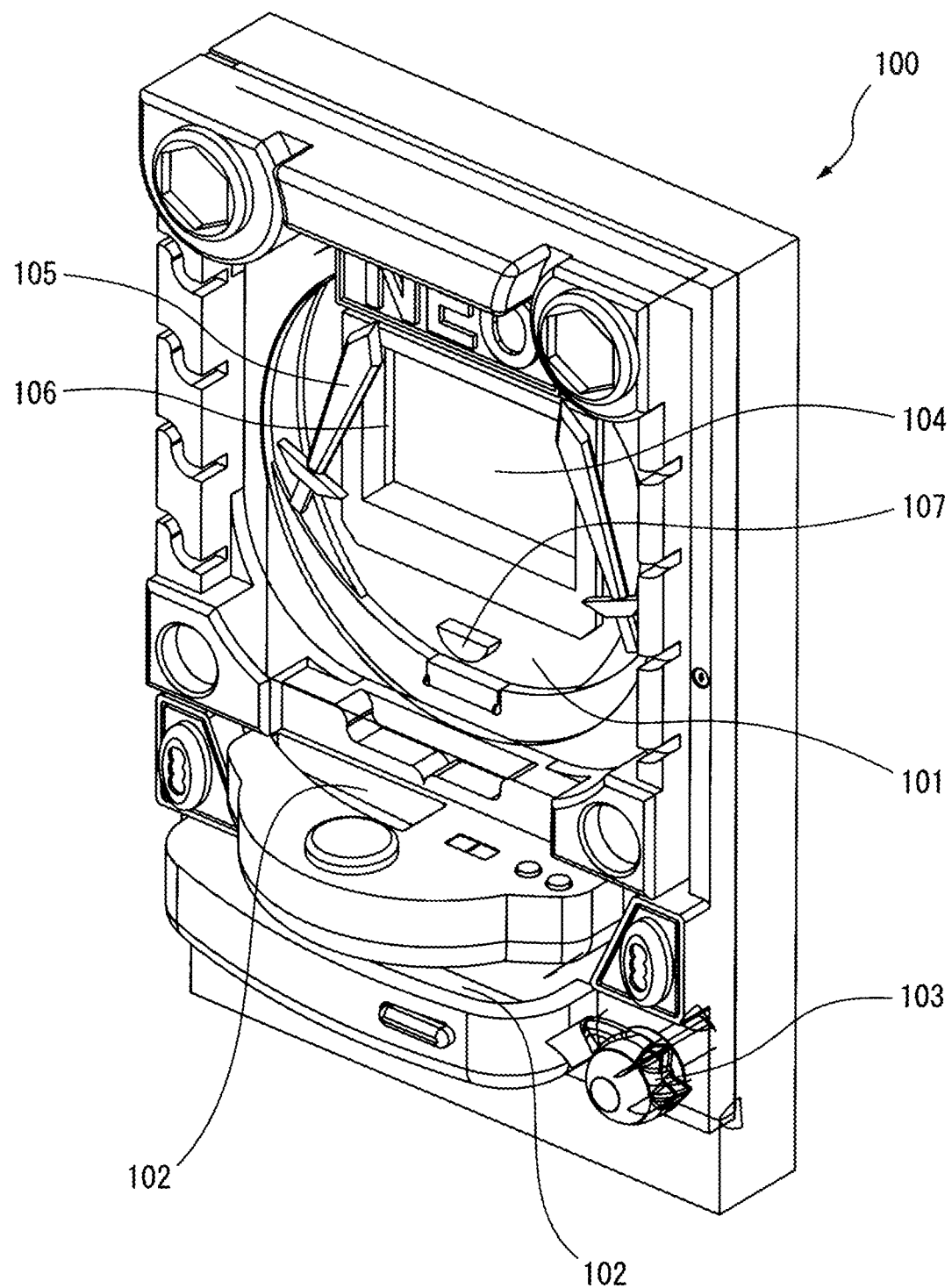
FIG. 9 is a schematic perspective view illustrating a pinball machine provided with a DC motor control device according one or more embodiments and modification examples.
Figure 10:
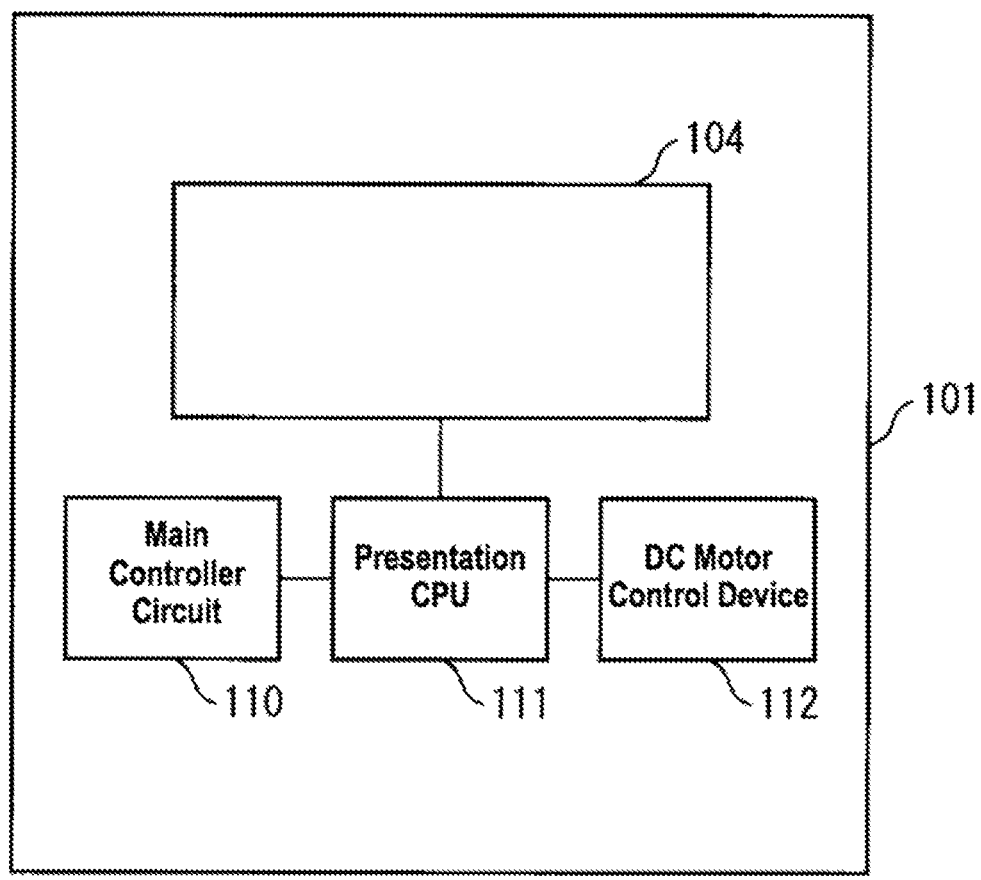
FIG. 10 is a schematic rear view illustrating a pinball machine, such as in FIG. 9.

FIG. 9 is a schematic perspective view of a pinball machine provided with a DC motor control device according one or more embodiments and modification examples; and FIG. 10 is a schematic rear view of a pinball machine 100. As illustrated in FIG. 9, a pinball machine 100 includes a playfield 101, which is the main game unit. The playfield 101 is where play takes place and takes up a majority of the machine, from the top portion to the center. The pinball machine 100 also includes a ball trough 102 arranged below the playfield 101, an input unit 103 provided with a jog; and a display device 104 provided at roughly the center of the playfield 101.

To aid in presenting the game, the pinball machine 100 includes a stationary gadget 105 arranged on the front surface of the playfield 101, at the lower part thereof and a presentation shutter 106, which is a moving gadget, arranged between the stationary gadget 105 and the display device 104. The playfield 101 includes rails (not shown) positioned at the sides. The playfield 101 may also include multiple obstacle pins (not shown) and at least one prize target 107.

The input unit 103 launches the pinball at a predetermined force via a launcher (not shown) in accordance with the amount of rotation of the jog by a player. A launched pinball travels upward along the rails and falls between the multiple obstacle pins. When a sensor (not shown) detects that a pinball has entered any of the prize targets 107, a main controller circuit 110 provided on the back the playfield 101 pays out a predetermined number of pinballs depending on the prize target 107 into the ball trough 102 via a payout device (not shown). The main controller circuit 110 causes the display device 104 to show various moving images via a presentation CPU 111 provided on the back of the playfield 101.

The presentation shutter 106 is an example of a moving body that travels in accordance with the state of play. A DC motor control device 112 according to one or more embodiments and modification examples is arranged at the back of the playfield 101; this DC motor control device 112 controls a DC motor (not shown) that drives the presentation shutter 106.

Figure 11:
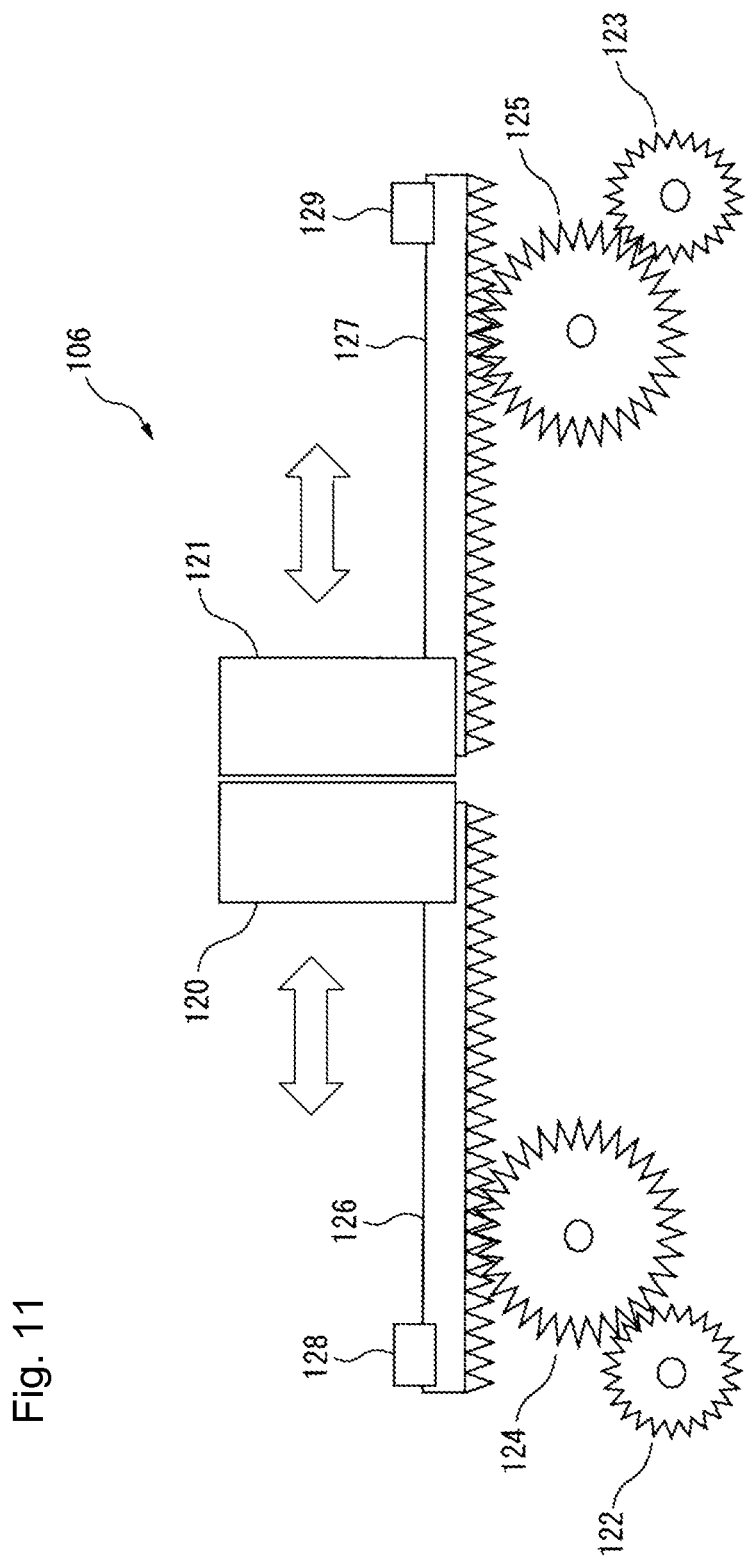
FIG. 11 is a diagram illustrating a configuration of a presentation shutter, such as in FIG. 9.

FIG. 11 illustrates a configuration of a presentations shutter 106; the presentation shutter 106 includes a left shelter 120 a right shelter 121, a first motor shaft 122, a second motor shaft 123, a first rack 124, a second rack 125, a first pinion 126, and a second opinion 127. The presentation shutter 106 also includes a first sensor 128 and a second sensor 129. The first motor shaft 122 and the second motor shaft 123 each rotate when driven by the DC motor (not shown) controlled by the DC motor control device 112.

The first rack 128 engages with the first motor shaft 122 so that the first rack 124 rotates in accordance with the rotation of the first motor shaft 122; the first motor shaft 122 rotates in accordance with the rotation of the DC motor (not shown). The left shutter 120 is bonded to and engages with the first opinion 126 so that the left shutter 120 travels horizontally in accordance with the rotation of the first pinion 126. The second rack 125 engages with the second motor shaft 123 so that the second rack 125 rotates in accordance with rotation of the second motor shaft 123; the second motor shaft 123 rotates in accordance with rotation of the DC motor (not shown). The right shutter 121 is bonded to and engages with the second pinion 127 to thereby travel horizontally in accordance with the rotation of the second pinion 127.

The first sensor 128 detects the present position of the left shutter 120 and outputs the present position to the presentation CPU 111; the second sensor 129 detects the present position of the right shutter 121 and outputs the present position to the presentation CPU 111.

Figure 12A:
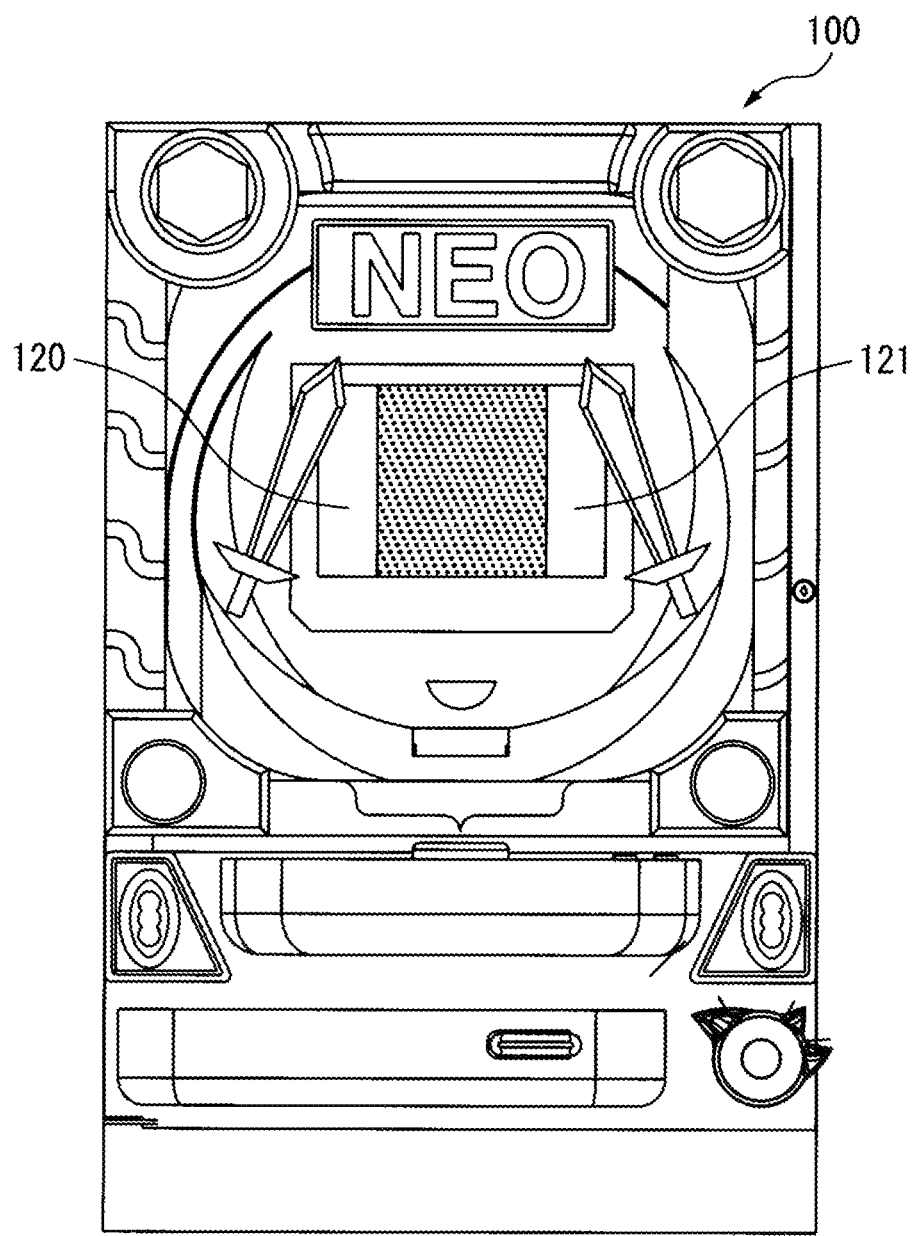
FIG. 12A is a front view illustrating a pinball machine and depicts a state where left and right shutters, such as in FIG. 11, are at the present position.
Figure 12B:
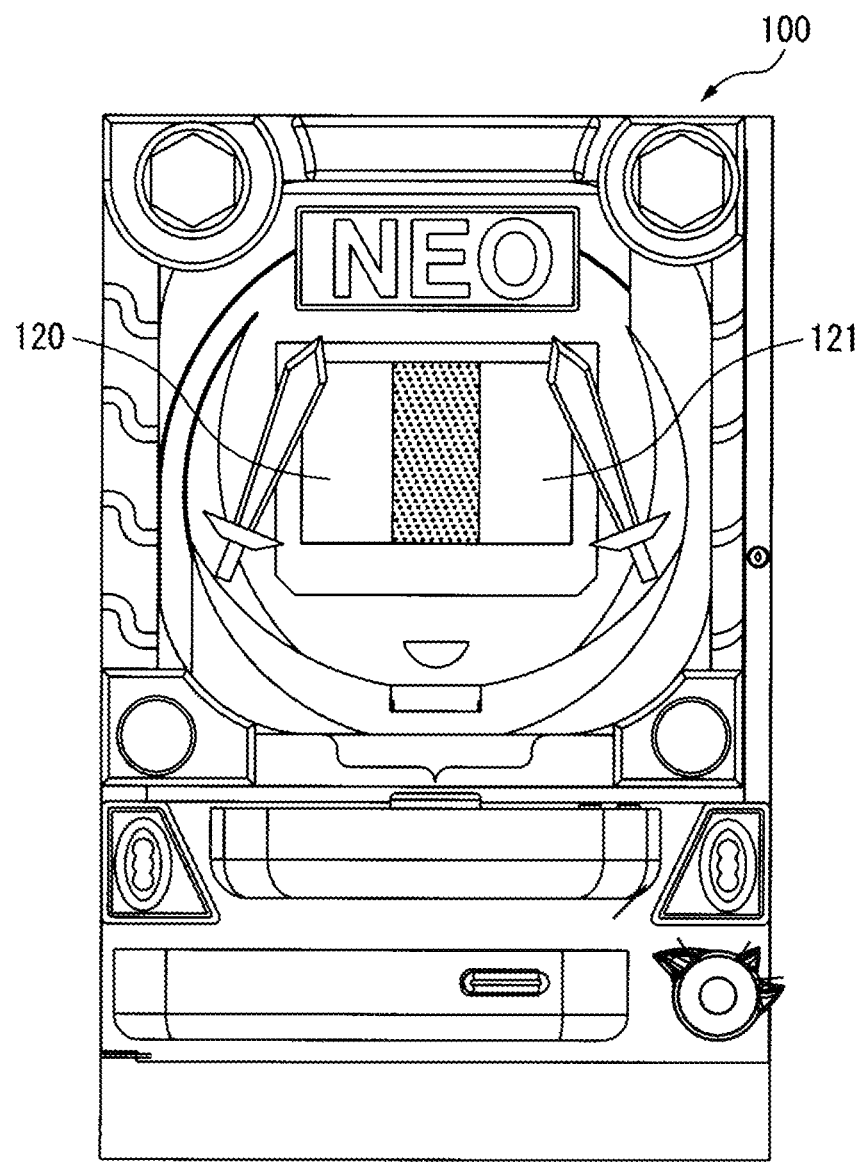
FIG. 12B is a front view illustrating a pinball machine and depicts a state where left and right shutters, such as in FIG. 11, are at the destination position.

FIG. 12A is a front view of the pinball machine and depicts the left shutter 120 and the right shutter 121 at a present position; and FIG. 12B is a front view of the pinball machine and depicts the left shutter 120 and the right shutter 121 at a destination position.

The DC motor control device 112 in the pinball machine 100 repeatedly operates the DC motor, to thereby cause both the left shutter 120 and the right shutter 121 to travel back and forth from the present position illustrated in FIG. 12A and the destination position illustrated in FIG. 12B multiple times. Both the left shutter 120 and the right shutter 121 move back and forth multiple times between a present position and a destination position in the pinball machine 100; this achieves better quality effects that serves to increase a player's interest in the game.

Figure 13:
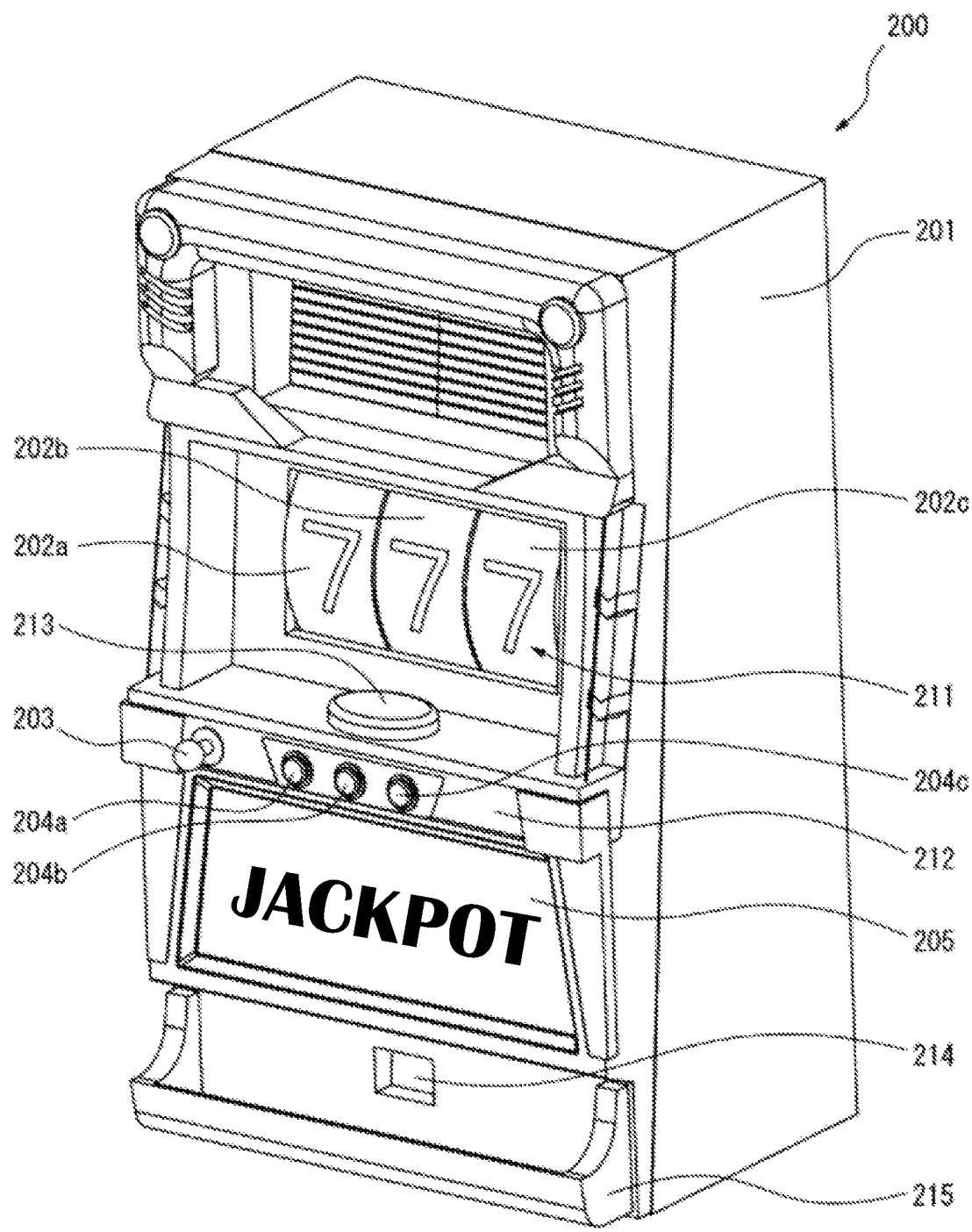
FIG. 13 is a schematic perspective view illustrating a slot machine provided with a DC motor control device according one or more embodiments and modification examples.
Figure 14:
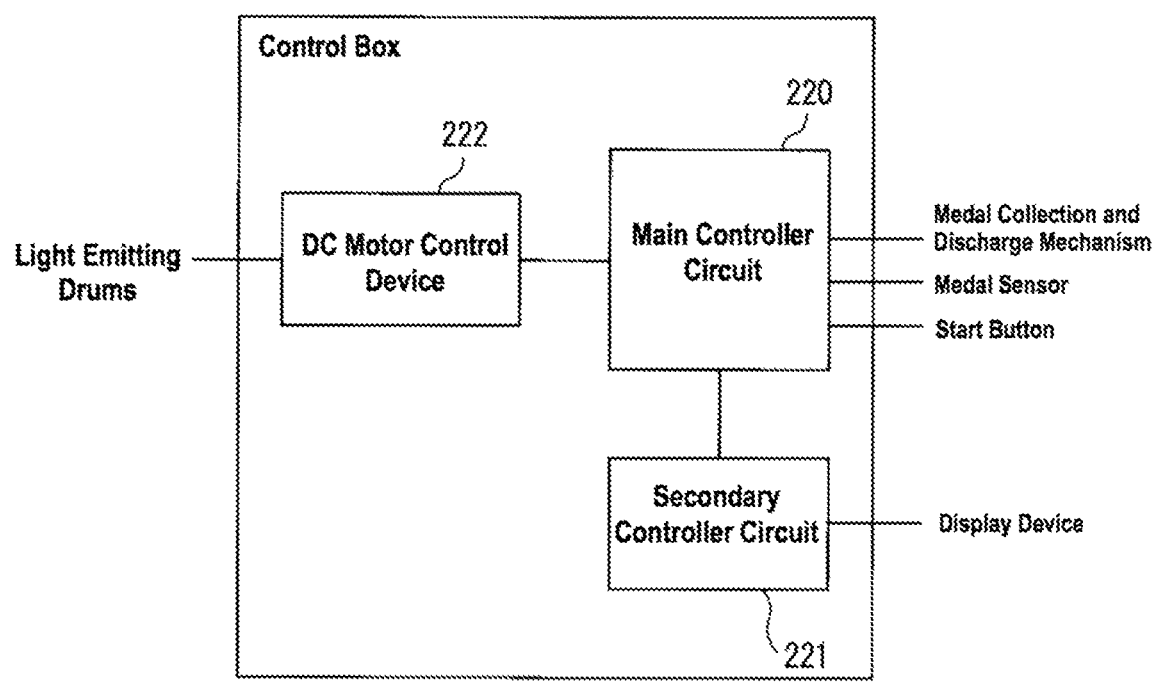
FIG. 14 is a block diagram illustrating a control box housed inside a slot machine, such as in FIG. 13.

FIG. 13 is a schematic perspective view of a slot machine 200 provided with a DC motor control device according one or more embodiments and modification examples; and FIG. 14 is a block diagram of a control box housed inside the slot machine 200 illustrated in FIG. 13. The slot machine 200 includes a main enclosure 201 which is the game machine unit, light emitting drums 202a-202c, a start lever 203, stop buttons 204a-204c, and a display device 205. The control box housed in the main enclosure 201 of the slot machine 200 stores, for example, a main controller circuit 220, a secondary controller circuit 221, and a DC motor control device 222. The main controller circuit 220 control the entire slot machine 200, while the secondary controller circuit 221 controls the components involved in the presentation of play such as the display device 205 and the speakers (not shown). The DC motor control device 222 controls a motor (not shown) that rotates the light emitting drums 202a-202c. The slot machine 200 includes a mechanism inside the main enclosure 201 to temporarily collect medals and to discharge the medals accumulated in accordance with a control signal from the main controller circuit 220.

A window 211 is formed in the upper central portion of the front surface of the main enclosure 201 in the slot machine 200; the light emitting drums 202a-202c can be seen through this window 211. The upper surface of a frame 212 below the window 211 is provided within medal input slot 213 through which medals may be inserted. The light emitting drums 202a-202c are each configured to rotate separately about a rotation shaft (not shown) that is substantially horizontal and roughly parallel to the front surface of the main enclosure 201; the light emitting drums 202a-202c rotate in accordance with a control signal from the DC motor control device 222 according to one or more embodiments and modification examples. The outer surface of each of the light emitting drums 202a-202c is divided along the rotation direction into a plurality of regions of roughly identical width, with various graphic patterns drawn on each region. The start lever 203 is provided at the left part on the main enclosure 201 oriented frontward from the frame 212. The stop buttons 204a-204c are provided at roughly the center on the front surface of the frame 212. The stop buttons 204a-204c correspond to the light emitting drums 202a-202c, respectively.

The display device 205 is provided as a lower panel at the lower front part of the main enclosure 201. A medal discharge slot 214 is provided in the main enclosure 201 below the display device 205 for discharging medals. A medal receiver tray 215 is attached below the medal discharge slot 214 to prevent discharged medals from falling.

After a medal is inserted through the medal input slot 213, and the start lever 203 is operated, a signal is transmitted to the main controller circuit 220 indicating that the start lever 203 was operated. The main controller circuit 220 then starts rotating the light emitting drums 202a-202c. When any of the stop buttons 204a-204c provided at roughly the front center part of the frame 212 on the main enclosure 201 is pressed, the main controller circuit 220 receives a signal indicating which switch was pressed, and the main controller circuit 220 stops the rotation of the light emitting drum corresponding to that switch. Alternatively, the main controller circuit 220 may stop the light emitting drum after a predetermined period has elapsed when the corresponding switch remains un-pressed if the predetermined period has elapsed since rotation of the light emitting drums began. The main controller circuit 220 discharges a predetermined number of medals through the medal discharge slot 214 if the same graphic pattern is lined up on all the light emitting drums at the moment all the drums stop rotating; the predetermined number of medals here corresponds to the graphic pattern.

Figure 15A:
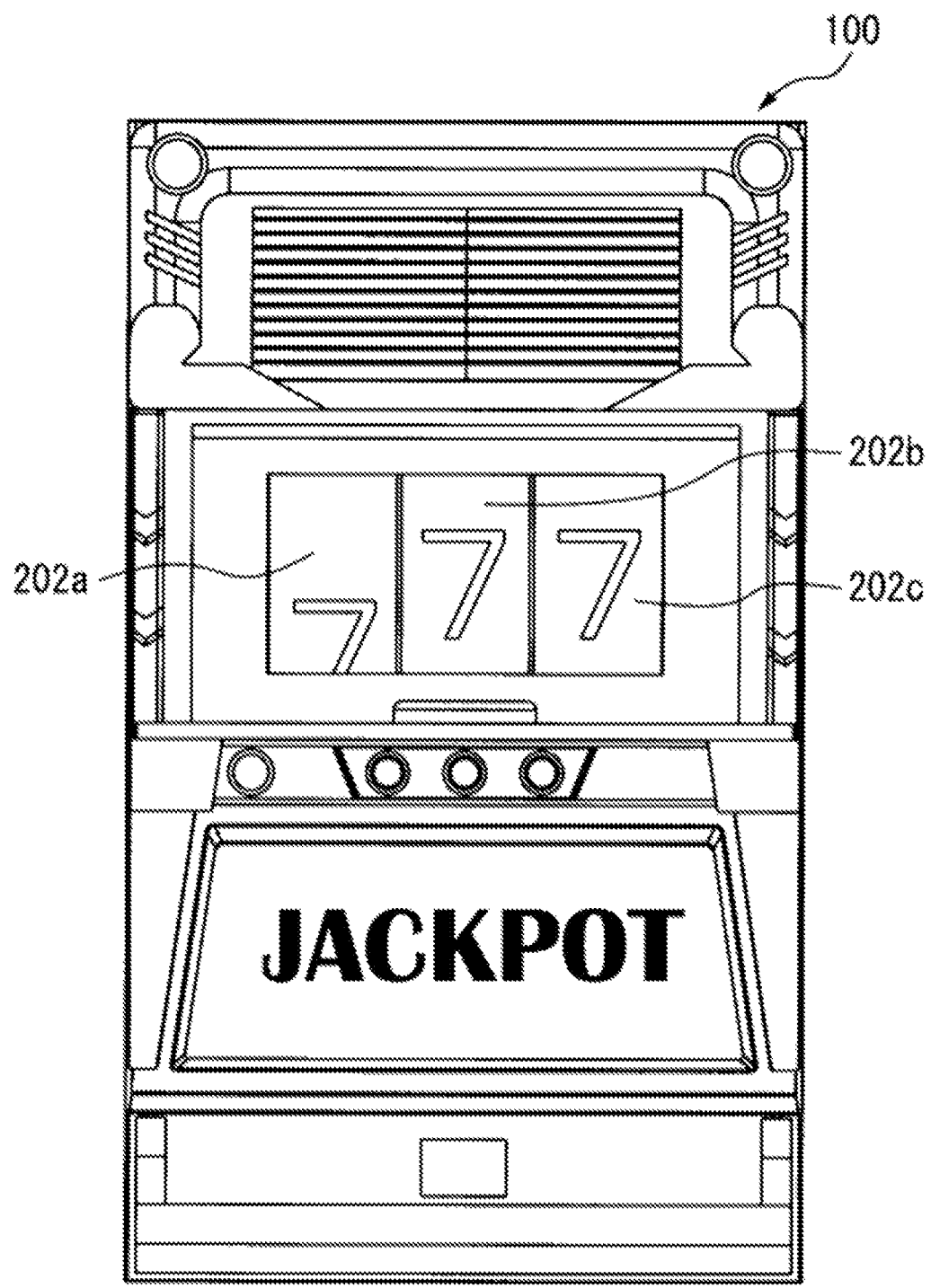
FIG. 15A is a front view illustrating a slot machine and depicts a single light emitting drum, such as in FIG. 13, at a present position.
Figure 15B:
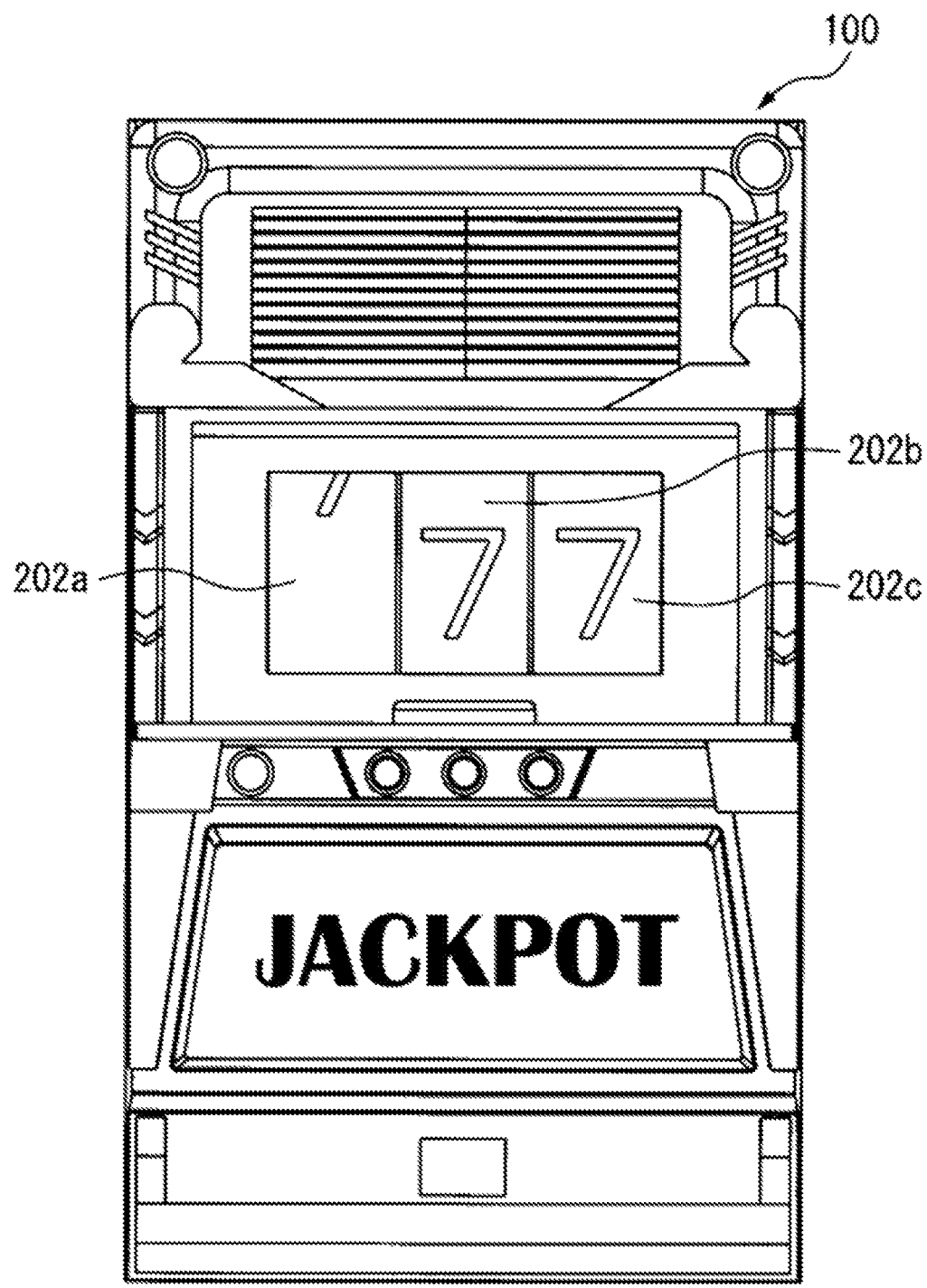
FIG. 15B is a front view illustrating a slot machine and depicts a state where a single light emitting drum, such as in FIG. 13, is at the present position.

FIG. 15A is a front view of the slot machine and depicts a light emitting drum 202a at a present position; and FIG. 15B is a front view of the slot machine and depicts a light emitting drum 202a at the destination position.

The DC motor control device 222 in the slot machine 200 repeatedly operates the DC motor, to thereby cause the light emitting drum 202a to travel back and forth from the present position illustrated in FIG. 15A and the destination position illustrated in FIG. 15B multiple times. The light emitting drum 202a moves back and forth multiple times between the present position and the destination position in the slot machine 200; this achieves better quality effects that serves to increase a player's interest in the game.

The DC motor control device according to one or more embodiments may be mounted in various kinds of other electronic device other than a game machine. For instance, the DC motor control device may be used to control the motor in an industrial robot to operate, for instance, the arm of the robot back and forth multiple times or cause the arm to rotate multiple times.

A person having ordinary skill in the art may make various modifications in the above manner within the scope of the invention in accordance with how the device will be used.

The invention claimed is:

1. A driving-device control apparatus configured to receive a control command from a host controller and control a driving device configured to drive a moving body, the driving-device control apparatus comprising:
   a communication circuit configured to receive the control command comprising a round-trip instruction that causes the moving body to operate back and forth; and
   a control circuit configured to control the driving device so that the driving device operates the moving body back and forth by moving the moving body a target rotation amount in an outbound direction, reversing a rotation direction of the driving device, and moving the moving body the target rotation amount in an inbound direction opposite the outbound direction in response to the control command comprising the round-trip instruction.

2. The driving-device control apparatus according to claim 1, further comprising:
   a memory circuit configured to store a present position for the moving body, wherein
   the control circuit controls the driving device to operate the moving body back and forth between the present position and a destination position.

3. The driving-device control apparatus according to claim 2, wherein the control command further comprises the destination position.

4. The driving-device control apparatus according to claim 1, wherein the control command further comprises a target rotation speed for the driving device; and
   the control circuit controls the driving device so that driving device rotates at the target rotation speed in response to operating the moving body back and forth.

5. The driving-device control apparatus according to claim 1, wherein; the control command further comprises a repeat instruction that directs operation back and forth multiple times; and
   the control circuit controls the driving device so that the moving body operates back and forth for a predetermined number of repetitions in response to the control command comprising the repeat instruction.

6. A game machine comprising the driving-device control apparatus according to claim 1, the game machine comprising:
   a main game unit;
   the moving body arranged on a front surface of the main game unit and configured to move in a predetermined configured range;

the driving device configured to drive the moving body; and a processor configured to perform operations comprising operation as a host control unit configured to control a presentation in accordance with a state of play, wherein the driving-device control apparatus is configured to receive the control command from the host control unit and to control the driving device.

7. The driving-device control apparatus according to claim 2, wherein the control command further comprises a target rotation speed for the driving device; and the control circuit controls the driving device so that driving device rotates at the target rotation speed in response to operating the moving body back and forth.

8. The driving-device control apparatus according to claim 3, wherein the control command further comprises a target rotation speed for the driving device; and the control circuit controls the driving device so that driving device rotates at the target rotation speed in response to operating the moving body back and forth.

9. The driving-device control apparatus according to claim 2, wherein; the control command further comprises a repeat instruction that directs operation back and forth multiple times; and the control circuit controls the driving device so that the moving body operates back and forth for a predetermined number of repetitions in response to the control command comprising the repeat instruction.

10. The driving-device control apparatus according to claim 3, wherein; the control command further comprises a repeat instruction that directs operation back and forth multiple times; and the control circuit controls the driving device so that the moving body operates back and forth for a predetermined number of repetitions in response to the control command comprising the repeat instruction.

11. The driving-device control apparatus according to claim 4, wherein; the control command further comprises a repeat instruction that directs operation back and forth multiple times; and the control circuit controls the driving device so that the moving body operates back and forth for a predetermined number of repetitions in response to the control command comprising the repeat instruction.

12. A game machine comprising the driving-device control apparatus according to claim 2, the game machine comprising:

a main game unit;

the moving body arranged on a front surface of the main game unit and configured to move in a predetermined configured range;

the driving device configured to drive the moving body; and a processor configured to perform operations comprising operation as a host control unit configured to control a presentation in accordance with a state of play, wherein the driving-device control apparatus is configured to receive the control command from the host control unit and to control the driving device.

13. A game machine comprising the driving-device control apparatus according to claim 3, the game machine comprising:

a main game unit;

the moving body arranged on a front surface of the main game unit and configured to move in a predetermined configured range;

the driving device configured to drive the moving body; and a processor configured to perform operations comprising operation as a host control unit configured to control a presentation in accordance with a state of play, wherein the driving-device control apparatus is configured to receive the control command from the host control unit and to control the driving device.

14. A game machine comprising the driving-device control apparatus according to claim 4, the game machine comprising:

a main game unit;

the moving body arranged on a front surface of the main game unit and configured to move in a predetermined configured range;

the driving device configured to drive the moving body; and a processor configured to perform operations comprising operation as a host control unit configured to control a presentation in accordance with a state of play, wherein the driving-device control apparatus is configured to receive the control command from the host control unit and to control the driving device.

15. A game machine comprising the driving-device control apparatus according to claim 5, the game machine comprising:

a main game unit;

the moving body arranged on a front surface of the main game unit and configured to move in a predetermined configured range;

the driving device configured to drive the moving body; and a processor configured to perform operations comprising operation as a host control unit configured to control a presentation in accordance with a state of play, wherein the driving-device control apparatus is configured to receive the control command from the host control unit and to control the driving device.

* * * * *